United States Patent
Asmussen et al.

(10) Patent No.: US 9,286,294 B2
(45) Date of Patent: Mar. 15, 2016

(54) VIDEO AND DIGITAL MULTIMEDIA AGGREGATOR CONTENT SUGGESTION ENGINE

(75) Inventors: Michael L. Asmussen, Oak Hill, VA (US); John S. Mccoskey, Castle Rock, CO (US); William D. Swart, Fairfax, VA (US)

(73) Assignee: Comcast IP Holdings I, LLC, Philadelphia, PA (US)

( * ) Notice: Subject to any disclaimer, the term of this patent is extended or adjusted under 35 U.S.C. 154(b) by 2050 days.

(21) Appl. No.: 09/921,057

(22) Filed: Aug. 3, 2001

(65) Prior Publication Data

US 2002/0042923 A1  Apr. 11, 2002

(51) Int. Cl.
*G06F 17/30* (2006.01)
*H04H 20/42* (2008.01)
(Continued)

(52) U.S. Cl.
CPC .... *G06F 17/30017* (2013.01); *G06F 17/30817* (2013.01); *G06F 17/30828* (2013.01); *H04H 20/42* (2013.01); *H04H 20/91* (2013.01); *H04H 60/04* (2013.01); *H04H 60/25* (2013.01); *H04H 60/64* (2013.01); *H04H 60/73* (2013.01);
(Continued)

(58) Field of Classification Search
CPC ................................................ G06F 17/30646
USPC ................... 707/3, 104.1, 5, 767, 749; 704/9; 725/114, 46
See application file for complete search history.

(56) References Cited

U.S. PATENT DOCUMENTS 3,639,686 A   2/1972   Walker et al.
3,733,430 A   5/1973   Thompson et al.
(Continued)

FOREIGN PATENT DOCUMENTS

CA   2414183 A1   12/2001
DE   3423846 A1   1/1986
(Continued)

OTHER PUBLICATIONS

Henry Chadwick et al., "Digital Audio-Visual Council", TV Anytime and TV Anywhere, Dec. 1999, pp. 1-140.
(Continued)

*Primary Examiner* — Apu Mofiz
*Assistant Examiner* — Chelcie Daye
(74) *Attorney, Agent, or Firm* — Banner & Witcoff, Ltd.

(57) ABSTRACT

To allow a user to maximize use of a video and digital multimedia aggregator, a search suggestion engine and corresponding method may be used to provide suggestions of available content. The search suggestion engine starts by constructing a database of metadata elements or word items. The metadata element database may be constructed by using a crawler that periodically or continually crawls a content metadata database and extracts word items from the content metadata database. The word items are then processed according to a number of factors, including part-of-speech, entries in dictionaries and thesaurus and other factors. The thus-processed word items are indexed, and may be provided with a vector value. A subsequent search request submitted by the user may include search criteria that may be provided vector values. A processor within the search suggestion engine compares the vector values to determine if an indexed word item should be considered for retrieving the indexed word item's associated content. A list of suggested content is then generated. The list of suggested items may be ranked and filtered before being provided to the user.

26 Claims, 12 Drawing Sheets

(51) Int. Cl.

| | | |
|---|---|---|
| H04H 20/91 | (2008.01) | |
| H04H 60/04 | (2008.01) | |
| H04H 60/25 | (2008.01) | |
| H04H 60/64 | (2008.01) | |
| H04H 60/73 | (2008.01) | |
| H04N 5/60 | (2006.01) | |
| H04N 7/088 | (2006.01) | |
| H04N 7/10 | (2006.01) | |
| H04N 7/16 | (2011.01) | |
| H04N 7/173 | (2011.01) | |
| H04N 21/218 | (2011.01) | |
| H04N 21/2187 | (2011.01) | |
| H04N 21/222 | (2011.01) | |
| H04N 21/235 | (2011.01) | |
| H04N 21/236 | (2011.01) | |
| H04N 21/2362 | (2011.01) | |
| H04N 21/2381 | (2011.01) | |
| H04N 21/2389 | (2011.01) | |
| H04N 21/25 | (2011.01) | |
| H04N 21/2543 | (2011.01) | |
| H04N 21/258 | (2011.01) | |
| H04N 21/262 | (2011.01) | |
| H04N 21/2668 | (2011.01) | |
| H04N 21/422 | (2011.01) | |
| H04N 21/426 | (2011.01) | |
| H04N 21/431 | (2011.01) | |
| H04N 21/433 | (2011.01) | |
| H04N 21/434 | (2011.01) | |
| H04N 21/435 | (2011.01) | |
| H04N 21/4385 | (2011.01) | |
| H04N 21/442 | (2011.01) | |
| H04N 21/443 | (2011.01) | |
| H04N 21/45 | (2011.01) | |
| H04N 21/454 | (2011.01) | |
| H04N 21/462 | (2011.01) | |
| H04N 21/466 | (2011.01) | |
| H04N 21/47 | (2011.01) | |
| H04N 21/472 | (2011.01) | |
| H04N 21/475 | (2011.01) | |
| H04N 21/4786 | (2011.01) | |
| H04N 21/4788 | (2011.01) | |
| H04N 21/482 | (2011.01) | |
| H04N 21/643 | (2011.01) | |
| H04N 21/6543 | (2011.01) | |
| H04N 21/6547 | (2011.01) | |
| H04N 21/81 | (2011.01) | |
| H04N 21/858 | (2011.01) | |
| H04H 20/02 | (2008.01) | |
| H04H 60/23 | (2008.01) | |
| H04H 60/31 | (2008.01) | |
| H04M 1/57 | (2006.01) | |
| H04N 5/44 | (2011.01) | |
| H04N 5/445 | (2011.01) | |
| H04N 5/45 | (2011.01) | |
| H04N 21/478 | (2011.01) | |

(52) U.S. Cl.
CPC ......... *H04N5/4403* (2013.01); *H04N 5/44504* (2013.01); *H04N 5/44543* (2013.01); *H04N 5/44582* (2013.01); *H04N 5/44591* (2013.01); *H04N 5/602* (2013.01); *H04N 7/088* (2013.01); *H04N 7/0882* (2013.01); *H04N 7/0884* (2013.01); *H04N 7/0887* (2013.01); *H04N 7/10* (2013.01); *H04N 7/102* (2013.01); *H04N 7/163* (2013.01); *H04N 7/165* (2013.01); *H04N 7/173* (2013.01); *H04N 7/17318* (2013.01); *H04N 7/17336* (2013.01); *H04N 7/17354* (2013.01); *H04N 21/2181* (2013.01); *H04N 21/2187* (2013.01); *H04N 21/21815* (2013.01); *H04N 21/2221* (2013.01); *H04N 21/235* (2013.01); *H04N 21/2362* (2013.01); *H04N 21/2381* (2013.01); *H04N 21/2389* (2013.01); *H04N 21/23608* (2013.01); *H04N 21/252* (2013.01); *H04N 21/258* (2013.01); *H04N 21/2543* (2013.01); *H04N 21/25891* (2013.01); *H04N 21/2668* (2013.01); *H04N 21/26208* (2013.01); *H04N 21/26283* (2013.01); *H04N 21/4222* (2013.01); *H04N 21/42204* (2013.01); *H04N 21/42653* (2013.01); *H04N 21/435* (2013.01); *H04N 21/4312* (2013.01); *H04N 21/4314* (2013.01); *H04N 21/4316* (2013.01); *H04N 21/4331* (2013.01); *H04N 21/4344* (2013.01); *H04N 21/4345* (2013.01); *H04N 21/4385* (2013.01); *H04N 21/443* (2013.01); *H04N 21/44204* (2013.01); *H04N 21/454* (2013.01); *H04N 21/4532* (2013.01); *H04N 21/4622* (2013.01); *H04N 21/4662* (2013.01); *H04N 21/4668* (2013.01); *H04N 21/47* (2013.01); *H04N 21/472* (2013.01); *H04N 21/4755* (2013.01); *H04N 21/4786* (2013.01); *H04N 21/4788* (2013.01); *H04N 21/47211* (2013.01); *H04N 21/47214* (2013.01); *H04N 21/482* (2013.01); *H04N 21/4821* (2013.01); *H04N 21/64307* (2013.01); *H04N 21/6543* (2013.01); *H04N 21/6547* (2013.01); *H04N 21/812* (2013.01); *H04N 21/8146* (2013.01); *H04N 21/8586* (2013.01); *H04H 20/02* (2013.01); *H04H 60/23* (2013.01); *H04H 60/31* (2013.01); *H04M 1/57* (2013.01); *H04N 5/4401* (2013.01); *H04N 5/445* (2013.01); *H04N 5/45* (2013.01); *H04N 21/478* (2013.01); *H04N 2005/4405* (2013.01)

(56) References Cited

U.S. PATENT DOCUMENTS

| | | | |
|---|---|---|---|
| 3,754,211 | A | 8/1973 | Rocher et al. |
| 3,993,955 | A | 11/1976 | Belcher et al. |
| 4,197,590 | A | 4/1980 | Sukonick et al. |
| 4,213,124 | A | 7/1980 | Barda et al. |
| 4,225,884 | A | 9/1980 | Block et al. |
| 4,250,356 | A | 2/1981 | Hammer, Jr. et al. |
| 4,250,521 | A | 2/1981 | Wright |
| 4,264,924 | A | 4/1981 | Freeman |
| 4,264,964 | A | 4/1981 | Berger |
| 4,279,035 | A | 7/1981 | Skerlos |
| 4,290,063 | A | 9/1981 | Traster |
| 4,318,522 | A | 3/1982 | Appleberry |
| 4,331,794 | A | 5/1982 | D'Alelio et al. |
| 4,331,974 | A | 5/1982 | Cogswell et al. |
| 4,334,245 | A | 6/1982 | Michael |
| 4,361,848 | A | 11/1982 | Poignet et al. |
| 4,381,522 | A | 4/1983 | Lambert |
| 4,398,216 | A | 8/1983 | Field et al. |
| 4,402,279 | A | 9/1983 | Witte et al. |
| 4,437,093 | A | 3/1984 | Bradley |
| 4,450,481 | A | 5/1984 | Dickinson |
| 4,451,701 | A | 5/1984 | Bendig |
| 4,455,548 | A | 6/1984 | Burnett |
| 4,455,570 | A | 6/1984 | Saeki et al. |
| 4,456,925 | A | 6/1984 | Skerlos et al. |
| 4,479,142 | A | 10/1984 | Buschman et al. |
| 4,484,217 | A | 11/1984 | Block et al. |
| 4,484,218 | A | 11/1984 | Boland et al. |
| 4,488,179 | A | 12/1984 | Kru/ger et al. |

(56) References Cited

U.S. PATENT DOCUMENTS

| | | | |
|---|---|---|---|
| 4,496,976 A | 1/1985 | Swanson et al. |
| 4,507,680 A | 3/1985 | Freeman |
| 4,509,198 A | 4/1985 | Nagatomi |
| 4,513,315 A | 4/1985 | Dekker et al. |
| 4,517,598 A | 5/1985 | Van Valkenburg et al. |
| 4,520,356 A | 5/1985 | O'Keefe et al. |
| 4,520,921 A | 6/1985 | Vissing |
| 4,528,589 A | 7/1985 | Block et al. |
| 4,528,643 A | 7/1985 | Freeny, Jr. |
| D280,099 S | 8/1985 | Topp |
| 4,533,948 A | 8/1985 | McNamara et al. |
| 4,546,382 A | 10/1985 | McKenna et al. |
| 4,558,464 A | 12/1985 | O'Brien, Jr. |
| 4,567,512 A | 1/1986 | Abraham |
| 4,573,072 A | 2/1986 | Freeman |
| 4,581,484 A | 4/1986 | Bendig |
| 4,587,520 A | 5/1986 | Astle |
| RE32,187 E | 6/1986 | Barda et al. |
| 4,600,921 A | 7/1986 | Thomas |
| 4,602,278 A | 7/1986 | Pritchard et al. |
| 4,602,279 A | 7/1986 | Freeman |
| 4,605,964 A | 8/1986 | Chard |
| 4,620,289 A | 10/1986 | Chauvel |
| 4,621,282 A | 11/1986 | Ahern |
| 4,633,297 A | 12/1986 | Skerlos et al. |
| 4,633,462 A | 12/1986 | Stifle et al. |
| 4,639,225 A | 1/1987 | Washizuka |
| 4,641,205 A | 2/1987 | Beyers, Jr. |
| 4,646,150 A | 2/1987 | Robbins et al. |
| 4,647,964 A | 3/1987 | Weinblatt |
| 4,658,290 A | 4/1987 | McKenna et al. |
| 4,665,559 A | 5/1987 | Benun |
| 4,673,976 A | 6/1987 | Wreford-Howard |
| 4,674,085 A | 6/1987 | Aranguren et al. |
| 4,677,685 A | 6/1987 | Kurisu |
| 4,688,218 A | 8/1987 | Blineau et al. |
| 4,688,246 A | 8/1987 | Eilers et al. |
| 4,691,340 A | 9/1987 | Maeda et al. |
| 4,694,490 A | 9/1987 | Harvey et al. |
| 4,695,880 A | 9/1987 | Johnson et al. |
| 4,695,975 A | 9/1987 | Bedrij |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,712,239 A | 12/1987 | Frezza et al. |
| 4,724,491 A | 2/1988 | Lambert |
| 4,725,694 A | 2/1988 | Auer et al. |
| 4,734,764 A | 3/1988 | Pocock et al. |
| 4,739,318 A | 4/1988 | Cohen |
| 4,739,510 A | 4/1988 | Jeffers et al. |
| 4,740,834 A | 4/1988 | Mobarry |
| 4,742,344 A | 5/1988 | Nakagawa et al. |
| 4,745,468 A | 5/1988 | Von Kohorn |
| 4,745,479 A | 5/1988 | Waehner |
| 4,747,785 A | 5/1988 | Roberts et al. |
| 4,751,578 A | 6/1988 | Reiter et al. |
| 4,775,935 A | 10/1988 | Yourick |
| 4,779,138 A | 10/1988 | Nomura et al. |
| RE32,776 E | 11/1988 | Saylor |
| 4,792,848 A | 12/1988 | Nussrallah et al. |
| 4,792,849 A | 12/1988 | McCalley et al. |
| 4,792,972 A | 12/1988 | Cook, Jr. |
| 4,797,568 A | 1/1989 | Gumbs |
| 4,797,918 A | 1/1989 | Lee et al. |
| 4,802,008 A | 1/1989 | Walling |
| 4,805,014 A | 2/1989 | Sahara et al. |
| 4,816,901 A | 3/1989 | Music et al. |
| 4,816,904 A | 3/1989 | McKenna et al. |
| 4,825,200 A | 4/1989 | Evans et al. |
| 4,825,220 A | 4/1989 | Edward et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. |
| 4,835,607 A | 5/1989 | Keith |
| 4,845,662 A | 7/1989 | Tokumitsu |
| 4,847,825 A | 7/1989 | Levine |
| 4,860,123 A | 8/1989 | McCalley et al. |
| 4,860,379 A | 8/1989 | Schoeneberger et al. ......... 455/5 |
| 4,866,770 A | 9/1989 | Seth-Smith et al. |
| 4,876,592 A | 10/1989 | Von Kohorn |
| 4,876,736 A | 10/1989 | Kiewit |
| 4,878,048 A | 10/1989 | Gottesman et al. |
| 4,884,267 A | 11/1989 | Miyamoto et al. |
| 4,885,775 A | 12/1989 | Lucas |
| 4,885,803 A | 12/1989 | Hermann et al. |
| 4,887,308 A | 12/1989 | Dutton |
| 4,888,638 A | 12/1989 | Bohn |
| 4,890,321 A | 12/1989 | Seth-Smith et al. |
| 4,896,354 A | 1/1990 | Inagaki et al. |
| 4,896,370 A | 1/1990 | Kasparian et al. |
| 4,905,094 A | 2/1990 | Pocock et al. |
| 4,907,082 A | 3/1990 | Richards |
| 4,908,713 A | 3/1990 | Levine |
| 4,916,441 A | 4/1990 | Gombrich |
| 4,918,516 A | 4/1990 | Freeman |
| 4,920,432 A | 4/1990 | Eggers et al. |
| 4,922,529 A | 5/1990 | Kiel |
| 4,924,303 A | 5/1990 | Brandon et al. |
| 4,926,255 A | 5/1990 | Von Kohorn |
| 4,928,168 A | 5/1990 | Iwashita |
| 4,930,160 A | 5/1990 | Vogel |
| 4,931,872 A | 6/1990 | Stoddard et al. |
| 4,935,924 A | 6/1990 | Baxter |
| 4,941,040 A | 7/1990 | Pocock et al. |
| 4,943,963 A | 7/1990 | Waechter et al. |
| 4,947,429 A | 8/1990 | Bestler et al. |
| 4,949,187 A | 8/1990 | Cohen |
| 4,956,725 A | 9/1990 | Kozuki et al. |
| 4,959,810 A | 9/1990 | Darbee et al. |
| 4,961,109 A | 10/1990 | Tanaka |
| 4,963,994 A | 10/1990 | Levine |
| 4,965,825 A | 10/1990 | Harvey et al. |
| 4,974,252 A | 11/1990 | Osborne |
| 4,975,771 A | 12/1990 | Kassatly |
| 4,975,951 A | 12/1990 | Bennett |
| 4,977,455 A | 12/1990 | Young |
| 4,985,697 A | 1/1991 | Boulton |
| 4,985,761 A | 1/1991 | Adams |
| 4,991,011 A | 2/1991 | Johnson et al. |
| 4,994,908 A | 2/1991 | Kuban et al. |
| 4,994,909 A | 2/1991 | Graves et al. |
| 4,995,074 A | 2/1991 | Goldman et al. |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,014,125 A | 5/1991 | Pocock et al. |
| 5,014,267 A | 5/1991 | Tompkins et al. |
| 5,015,829 A | 5/1991 | Eilert et al. |
| 5,020,129 A | 5/1991 | Martin et al. |
| 5,027,400 A | 6/1991 | Baji et al. |
| 5,029,014 A | 7/1991 | Lindstrom |
| 5,029,232 A | 7/1991 | Nall |
| 5,034,807 A | 7/1991 | Von Kohorn |
| 5,036,394 A | 7/1991 | Morii et al. |
| 5,036,537 A | 7/1991 | Jeffers et al. |
| 5,038,211 A | 8/1991 | Hallenbeck |
| 5,038,402 A | 8/1991 | Robbins |
| 5,040,067 A | 8/1991 | Yamazaki |
| 5,046,093 A | 9/1991 | Wachob |
| 5,047,858 A | 9/1991 | Aimonoya |
| 5,047,867 A | 9/1991 | Strubbe et al. |
| 5,047,887 A | 9/1991 | Boshek |
| 5,049,990 A | 9/1991 | Kondo et al. |
| 5,054,071 A | 10/1991 | Bacon |
| 5,055,924 A | 10/1991 | Skutta |
| 5,056,138 A | 10/1991 | Tyson, Sr. |
| 5,057,915 A | 10/1991 | Von Kohorn |
| 5,057,917 A | 10/1991 | Shalkauser et al. |
| 5,058,160 A | 10/1991 | Banker et al. |
| 5,066,319 A | 11/1991 | Lippold |

(56) References Cited

U.S. PATENT DOCUMENTS

| | | |
|---|---|---|
| 5,070,400 A | 12/1991 | Lieberman |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,083,205 A | 1/1992 | Arai |
| 5,091,782 A | 2/1992 | Krause et al. |
| 5,093,718 A | 3/1992 | Hoarty et al. |
| 5,099,319 A | 3/1992 | Esch et al. |
| D325,581 S | 4/1992 | Schwartz |
| 5,103,314 A | 4/1992 | Keenan |
| 5,105,268 A | 4/1992 | Yamanouchi et al. |
| 5,109,279 A | 4/1992 | Ando |
| 5,113,496 A | 5/1992 | McCalley et al. |
| 5,115,309 A | 5/1992 | Hang |
| 5,115,426 A | 5/1992 | Spanke |
| 5,119,188 A | 6/1992 | McCalley et al. |
| 5,121,205 A | 6/1992 | Ng et al. |
| 5,123,046 A | 6/1992 | Levine |
| 5,124,980 A | 6/1992 | Maki |
| 5,128,752 A | 7/1992 | Von Kohorn |
| 5,130,792 A | 7/1992 | Tindell et al. |
| 5,130,794 A | 7/1992 | Ritchey |
| 5,132,789 A | 7/1992 | Ammon et al. |
| 5,132,992 A | 7/1992 | Yurt et al. |
| 5,133,079 A | 7/1992 | Ballantyne et al. |
| 5,134,712 A | 7/1992 | Yamamoto |
| 5,142,690 A | 8/1992 | McMullan, Jr. et al. |
| D329,238 S | 9/1992 | Grasso et al. |
| 5,144,445 A | 9/1992 | Higashitsutsumi |
| 5,144,663 A | 9/1992 | Kudelski et al. |
| 5,146,210 A | 9/1992 | Heberle |
| 5,150,118 A | 9/1992 | Finkle et al. |
| 5,151,782 A | 9/1992 | Ferraro |
| 5,151,785 A | 9/1992 | Citta |
| 5,151,789 A | 9/1992 | Young |
| 5,152,011 A | 9/1992 | Schwob |
| 5,153,763 A | 10/1992 | Pidgeon |
| 5,155,591 A | 10/1992 | Wachob |
| 5,157,717 A | 10/1992 | Hitchcock |
| 5,161,012 A | 11/1992 | Choi |
| 5,161,019 A | 11/1992 | Emanuel |
| 5,166,886 A | 11/1992 | Molnar et al. |
| D331,760 S | 12/1992 | Renk, Jr. |
| 5,168,372 A | 12/1992 | Sweetser |
| 5,172,413 A | 12/1992 | Bradley et al. |
| 5,172,423 A | 12/1992 | France |
| 5,182,639 A | 1/1993 | Jutamulia et al. |
| 5,182,640 A | 1/1993 | Takano |
| 5,187,710 A | 2/1993 | Chau et al. |
| 5,187,735 A | 2/1993 | Garcia et al. |
| 5,191,410 A | 3/1993 | McCalley et al. |
| 5,192,999 A | 3/1993 | Graczyk et al. |
| 5,195,022 A | 3/1993 | Hoppal et al. |
| 5,195,092 A | 3/1993 | Wilson et al. |
| 5,202,817 A | 4/1993 | Koenck et al. |
| 5,206,722 A | 4/1993 | Kwan |
| 5,206,929 A | 4/1993 | Langford et al. |
| 5,206,954 A | 4/1993 | Inoue et al. |
| 5,208,660 A | 5/1993 | Yoshida |
| 5,208,665 A | 5/1993 | McCalley et al. |
| 5,212,553 A | 5/1993 | Maruoka |
| 5,216,515 A | 6/1993 | Steele et al. |
| 5,221,962 A | 6/1993 | Backus et al. |
| 5,223,924 A | 6/1993 | Strubbe ..................... 725/46 |
| 5,227,874 A | 7/1993 | Von Kohorn |
| 5,229,852 A | 7/1993 | Maietta et al. |
| 5,231,494 A | 7/1993 | Wachob |
| 5,231,516 A | 7/1993 | Kamon et al. |
| 5,231,665 A | 7/1993 | Auld et al. |
| 5,233,654 A | 8/1993 | Harvey et al. |
| 5,235,328 A | 8/1993 | Kurita |
| 5,235,419 A | 8/1993 | Krause |
| 5,236,199 A | 8/1993 | Thompson, Jr. |
| 5,237,311 A | 8/1993 | Mailey et al. |
| 5,237,610 A | 8/1993 | Gammie et al. |
| 5,239,540 A | 8/1993 | Rovira et al. |
| 5,241,428 A | 8/1993 | Goldwasser et al. |
| 5,241,659 A | 8/1993 | Parulski et al. |
| 5,247,347 A | 9/1993 | Litteral et al. |
| 5,247,364 A | 9/1993 | Banker et al. |
| 5,247,575 A | 9/1993 | Sprague et al. |
| 5,249,044 A | 9/1993 | Von Kohorn |
| 5,251,324 A | 10/1993 | McMullan, Jr. |
| 5,253,066 A | 10/1993 | Vogel |
| 5,253,275 A | 10/1993 | Yurt et al. ..................... 375/122 |
| 5,253,341 A | 10/1993 | Rozmanith et al. |
| 5,255,086 A | 10/1993 | McMullan, Jr. et al. |
| D341,383 S | 11/1993 | London et al. |
| 5,260,778 A | 11/1993 | Kauffman et al. |
| 5,260,788 A | 11/1993 | Takano et al. |
| 5,264,933 A | 11/1993 | Rosser et al. |
| 5,270,809 A | 12/1993 | Gammie et al. |
| 5,274,700 A | 12/1993 | Gechter et al. |
| 5,276,731 A | 1/1994 | Arbel et al. |
| 5,282,028 A | 1/1994 | Johnson et al. |
| 5,283,561 A | 2/1994 | Lumelsky et al. |
| 5,283,639 A | 2/1994 | Esch et al. |
| 5,283,734 A | 2/1994 | Von Kohorn |
| 5,285,272 A | 2/1994 | Bradley et al. |
| 5,289,271 A | 2/1994 | Watson |
| 5,289,288 A | 2/1994 | Silverman et al. |
| 5,293,357 A | 3/1994 | Hallenbeck |
| 5,293,540 A | 3/1994 | Trani et al. |
| 5,293,633 A | 3/1994 | Robbins |
| 5,297,204 A | 3/1994 | Levine |
| 5,301,028 A | 4/1994 | Banker et al. |
| 5,301,050 A | 4/1994 | Czerwiec et al. |
| 5,303,295 A | 4/1994 | West et al. |
| 5,303,361 A | 4/1994 | Colwell et al. |
| 5,307,173 A | 4/1994 | Yuen et al. |
| 5,307,481 A | 4/1994 | Shimazaki et al. |
| 5,311,423 A | 5/1994 | Clark |
| 5,311,425 A | 5/1994 | Inada |
| 5,315,584 A | 5/1994 | Savary et al. |
| 5,317,391 A | 5/1994 | Banker et al. |
| 5,319,454 A | 6/1994 | Schutte |
| 5,319,455 A | 6/1994 | Hoarty et al. |
| 5,319,707 A | 6/1994 | Wasilewski et al. |
| 5,323,240 A | 6/1994 | Amano et al. ............... 348/731 |
| 5,327,554 A | 7/1994 | Palazzi, III et al. |
| 5,329,590 A | 7/1994 | Pond |
| 5,335,079 A | 8/1994 | Yuen et al. |
| 5,335,276 A | 8/1994 | Thompson et al. |
| 5,335,313 A | 8/1994 | Douglas |
| 5,339,239 A | 8/1994 | Manabe et al. |
| 5,339,315 A | 8/1994 | Maeda et al. |
| 5,341,166 A | 8/1994 | Garr et al. |
| 5,341,425 A | 8/1994 | Wasilewski et al. |
| 5,341,426 A | 8/1994 | Barney et al. |
| 5,341,474 A | 8/1994 | Gelman et al. |
| 5,343,239 A | 8/1994 | Lappington et al. |
| 5,343,516 A | 8/1994 | Callele et al. |
| 5,345,594 A | 9/1994 | Tsuda |
| 5,347,304 A | 9/1994 | Moura et al. |
| 5,349,638 A | 9/1994 | Pitroda et al. |
| 5,351,075 A | 9/1994 | Herz et al. |
| 5,353,121 A | 10/1994 | Young et al. ..................... 725/52 |
| 5,355,162 A | 10/1994 | Yazolino et al. |
| 5,357,276 A | 10/1994 | Banker et al. |
| 5,359,601 A | 10/1994 | Wasilewski et al. |
| 5,361,091 A | 11/1994 | Hoarty et al. |
| 5,363,431 A | 11/1994 | Schull et al. |
| 5,365,265 A | 11/1994 | Shibata et al. |
| 5,365,282 A | 11/1994 | Levine |
| 5,367,330 A | 11/1994 | Haave et al. |
| 5,367,571 A | 11/1994 | Bowen et al. |
| 5,373,330 A | 12/1994 | Levine |
| 5,374,951 A | 12/1994 | Welsh |
| 5,375,068 A | 12/1994 | Palmer et al. |
| 5,375,161 A | 12/1994 | Fuller et al. |
| 5,376,969 A | 12/1994 | Zdepski |
| 5,381,477 A | 1/1995 | Beyers, II et al. |
| 5,382,983 A | 1/1995 | Kwoh et al. |

(56) References Cited

U.S. PATENT DOCUMENTS

| | | |
|---|---|---|
| 5,384,588 A | 1/1995 | Martin et al. |
| 5,386,241 A | 1/1995 | Park |
| 5,387,941 A | 2/1995 | Montgomery et al. |
| 5,389,964 A | 2/1995 | Oberle et al. |
| 5,390,348 A | 2/1995 | Magin et al. |
| 5,393,964 A | 2/1995 | Hamilton et al. |
| 5,396,546 A | 3/1995 | Remillard |
| 5,398,074 A | 3/1995 | Duffield et al. |
| 5,400,401 A | 3/1995 | Wasilewski et al. |
| 5,400,402 A | 3/1995 | Garfinkle |
| 5,404,393 A | 4/1995 | Remillard .............. 379/93.25 |
| 5,404,505 A | 4/1995 | Levinson |
| 5,406,557 A | 4/1995 | Baudoin |
| 5,406,558 A | 4/1995 | Rovira et al. |
| 5,406,564 A | 4/1995 | Okita |
| 5,406,615 A | 4/1995 | Miller, II et al. |
| 5,408,258 A | 4/1995 | Kolessar |
| 5,410,326 A | 4/1995 | Goldstein |
| 5,410,344 A | 4/1995 | Graves et al. ................ 725/46 |
| 5,410,367 A | 4/1995 | Zahavi et al. |
| 5,412,416 A | 5/1995 | Nemirofsky |
| 5,412,720 A | 5/1995 | Hoarty |
| 5,414,426 A | 5/1995 | O'Donnell et al. |
| 5,414,448 A | 5/1995 | Wada et al. |
| 5,414,756 A | 5/1995 | Levine |
| 5,416,508 A | 5/1995 | Sakuma et al. |
| 5,420,647 A | 5/1995 | Levine |
| 5,420,866 A | 5/1995 | Wasilewski |
| 5,421,031 A | 5/1995 | De Bey |
| 5,422,674 A | 6/1995 | Hooper et al. |
| 5,424,770 A | 6/1995 | Schmelzer et al. |
| 5,426,699 A | 6/1995 | Wunderlich et al. |
| 5,428,404 A | 6/1995 | Ingram et al. |
| 5,428,608 A | 6/1995 | Freeman et al. |
| 5,432,542 A | 7/1995 | Thibadeau et al. |
| 5,432,561 A | 7/1995 | Strubbe |
| 5,438,370 A | 8/1995 | Primiano et al. |
| 5,438,372 A | 8/1995 | Tsumori et al. |
| 5,440,632 A | 8/1995 | Bacon et al. |
| 5,442,389 A | 8/1995 | Blahut et al. |
| 5,442,452 A | 8/1995 | Ryu |
| 5,442,626 A | 8/1995 | Wei |
| 5,446,490 A | 8/1995 | Blahut et al. |
| 5,446,891 A | 8/1995 | Kaplan et al. |
| 5,446,919 A | 8/1995 | Wilkins |
| 5,448,313 A | 9/1995 | Kim et al. |
| 5,448,568 A | 9/1995 | Delpuch et al. |
| 5,449,970 A | 9/1995 | Kumar et al. |
| 5,461,667 A | 10/1995 | Remillard |
| 5,467,144 A | 11/1995 | Saeger et al. |
| 5,467,402 A | 11/1995 | Okuyama et al. |
| 5,469,206 A | 11/1995 | Strubbe et al. |
| 5,473,362 A | 12/1995 | Fitzgerald et al. |
| 5,473,609 A | 12/1995 | Chaney |
| 5,473,704 A | 12/1995 | Abe |
| 5,475,382 A | 12/1995 | Yuen et al. |
| 5,477,262 A | 12/1995 | Banker et al. |
| 5,477,263 A | 12/1995 | O'Callaghan et al. |
| 5,479,266 A | 12/1995 | Young et al. |
| 5,479,268 A | 12/1995 | Young et al. |
| 5,479,411 A | 12/1995 | Klein |
| 5,479,508 A | 12/1995 | Bestler et al. |
| 5,481,294 A | 1/1996 | Thomas et al. |
| 5,481,296 A | 1/1996 | Cragun et al. |
| 5,481,542 A | 1/1996 | Logston et al. |
| 5,483,277 A | 1/1996 | Granger |
| 5,483,278 A | 1/1996 | Strubbe et al. |
| 5,483,287 A | 1/1996 | Siracusa |
| 5,483,588 A | 1/1996 | Eaton et al. |
| 5,485,197 A | 1/1996 | Hoarty |
| 5,485,221 A | 1/1996 | Banker et al. |
| 5,488,409 A | 1/1996 | Yuen et al. |
| 5,488,412 A | 1/1996 | Majeti et al. |
| 5,490,247 A | 2/1996 | Tung et al. |
| 5,493,339 A | 2/1996 | Birch et al. |
| 5,493,568 A | 2/1996 | Sampat et al. |
| 5,493,638 A | 2/1996 | Hooper et al. |
| 5,493,677 A * | 2/1996 | Balogh ............... G06F 17/3025 382/305 |
| 5,497,187 A | 3/1996 | Banker et al. |
| 5,500,794 A | 3/1996 | Fujita et al. |
| 5,500,933 A | 3/1996 | Schnorf |
| 5,502,504 A | 3/1996 | Marshall et al. |
| 5,508,733 A | 4/1996 | Kassatly |
| 5,508,815 A | 4/1996 | Levine |
| 5,512,934 A | 4/1996 | Kochanski |
| 5,512,935 A | 4/1996 | Majeti et al. |
| 5,515,098 A | 5/1996 | Carles |
| 5,515,106 A | 5/1996 | Chaney et al. |
| 5,515,173 A | 5/1996 | Mankovitz et al. |
| 5,517,257 A | 5/1996 | Dunn et al. |
| 5,517,502 A | 5/1996 | Bestler et al. |
| 5,523,794 A | 6/1996 | Mankovitz et al. |
| 5,523,796 A | 6/1996 | Marshall et al. |
| 5,526,034 A | 6/1996 | Hoarty et al. |
| 5,528,281 A | 6/1996 | Grady et al. |
| 5,530,754 A | 6/1996 | Garfinkle |
| 5,532,732 A | 7/1996 | Yuen et al. |
| 5,532,754 A | 7/1996 | Young et al. |
| 5,533,110 A | 7/1996 | Pinard et al. |
| 5,534,913 A | 7/1996 | Majeti et al. |
| 5,534,944 A | 7/1996 | Egawa et al. |
| 5,537,141 A | 7/1996 | Harper et al. |
| 5,537,153 A | 7/1996 | Shigihara |
| 5,537,157 A | 7/1996 | Washino et al. |
| 5,539,391 A | 7/1996 | Yuen |
| 5,539,449 A | 7/1996 | Blahut et al. |
| 5,539,822 A | 7/1996 | Lett |
| 5,539,871 A | 7/1996 | Gibson |
| 5,543,852 A | 8/1996 | Yuen et al. |
| 5,543,853 A | 8/1996 | Haskell et al. |
| 5,544,161 A | 8/1996 | Bigham et al. |
| 5,546,316 A | 8/1996 | Buckley et al. |
| 5,546,447 A | 8/1996 | Skarbo et al. |
| 5,550,576 A | 8/1996 | Klosterman |
| 5,550,863 A | 8/1996 | Yurt et al. |
| 5,552,837 A | 9/1996 | Mankovitz |
| 5,553,123 A | 9/1996 | Chan et al. |
| 5,557,316 A | 9/1996 | Hoarty et al. |
| 5,559,548 A | 9/1996 | Davis et al. |
| 5,559,549 A | 9/1996 | Hendricks et al. |
| 5,559,550 A | 9/1996 | Mankovitz |
| 5,559,800 A | 9/1996 | Mousseau et al. |
| 5,559,870 A | 9/1996 | Patton et al. |
| 5,561,604 A | 10/1996 | Buckley et al. |
| 5,561,708 A | 10/1996 | Remillard |
| 5,561,709 A | 10/1996 | Remillard |
| 5,568,272 A | 10/1996 | Levine |
| 5,570,126 A | 10/1996 | Blahut et al. |
| 5,572,005 A | 11/1996 | Hamilton et al. |
| 5,579,055 A | 11/1996 | Hamilton et al. |
| 5,579,057 A | 11/1996 | Banker et al. |
| 5,579,522 A | 11/1996 | Christeson et al. |
| 5,581,614 A | 12/1996 | Ng et al. |
| 5,583,560 A | 12/1996 | Florin et al. |
| 5,583,576 A | 12/1996 | Perlman et al. |
| 5,583,965 A | 12/1996 | Douma et al. |
| 5,584,054 A | 12/1996 | Tyneski et al. |
| 5,585,838 A | 12/1996 | Lawler et al. |
| 5,585,865 A | 12/1996 | Amano et al. |
| 5,585,866 A | 12/1996 | Miller et al. |
| 5,587,735 A | 12/1996 | Ishida et al. |
| 5,588,104 A | 12/1996 | Lanier et al. |
| 5,588,139 A | 12/1996 | Lanier et al. |
| 5,589,892 A | 12/1996 | Knee et al. |
| 5,592,529 A | 1/1997 | Linsker |
| 5,592,551 A | 1/1997 | Lett et al. |
| 5,594,509 A | 1/1997 | Florin et al. |
| 5,596,373 A | 1/1997 | White et al. |
| 5,598,415 A | 1/1997 | Nuber et al. |
| 5,598,525 A | 1/1997 | Nally et al. |
| 5,600,364 A | 2/1997 | Hendricks et al. |
| 5,600,368 A | 2/1997 | Matthews, III |
| 5,600,378 A | 2/1997 | Wasilewski |

(56) References Cited

U.S. PATENT DOCUMENTS

| | | |
|---|---|---|
| 5,600,573 A | 2/1997 | Hendricks et al. ............ 725/109 |
| 5,600,711 A | 2/1997 | Yuen |
| 5,600,775 A | 2/1997 | King et al. |
| 5,604,528 A | 2/1997 | Edwards et al. |
| 5,608,447 A | 3/1997 | Farry et al. |
| 5,610,910 A | 3/1997 | Focsaneanu et al. |
| 5,612,997 A | 3/1997 | Vallelonga, Sr. et al. |
| 5,615,252 A | 3/1997 | Sizer, II et al. |
| 5,619,247 A | 4/1997 | Russo |
| 5,619,249 A | 4/1997 | Billock et al. |
| 5,619,269 A | 4/1997 | Lee et al. |
| 5,619,274 A | 4/1997 | Roop et al. |
| 5,619,337 A | 4/1997 | Naimpally |
| 5,619,383 A | 4/1997 | Ngai |
| 5,619,684 A | 4/1997 | Goodwin et al. |
| 5,621,456 A | 4/1997 | Florin et al. |
| 5,621,579 A | 4/1997 | Yuen |
| 5,621,793 A | 4/1997 | Bednarek et al. |
| 5,623,308 A | 4/1997 | Civanlar et al. |
| 5,625,405 A | 4/1997 | DuLac et al. |
| 5,625,406 A | 4/1997 | Newberry et al. |
| 5,628,005 A | 5/1997 | Hurvig |
| 5,629,733 A | 5/1997 | Youman et al. |
| 5,629,978 A | 5/1997 | Blumhardt et al. |
| 5,630,103 A | 5/1997 | Smith et al. |
| 5,630,119 A | 5/1997 | Aristides et al. |
| 5,633,683 A | 5/1997 | Rosengren et al. |
| 5,633,810 A | 5/1997 | Mandal et al. |
| 5,635,978 A | 6/1997 | Alten et al. |
| 5,635,989 A | 6/1997 | Rothmuller |
| 5,636,346 A | 6/1997 | Saxe |
| 5,638,505 A | 6/1997 | Hemenway et al. |
| 5,639,350 A | 6/1997 | Aula et al. |
| 5,640,196 A | 6/1997 | Behrens et al. |
| 5,642,348 A | 6/1997 | Barzegar et al. |
| 5,644,354 A | 7/1997 | Thompson et al. |
| 5,644,628 A | 7/1997 | Schwarzer et al. |
| 5,652,614 A | 7/1997 | Okabayashi |
| 5,652,615 A | 7/1997 | Bryant et al. |
| 5,652,789 A | 7/1997 | Miner et al. |
| 5,657,072 A | 8/1997 | Aristides et al. |
| 5,659,350 A | 8/1997 | Hendricks et al. |
| 5,659,367 A | 8/1997 | Yuen |
| 5,661,516 A | 8/1997 | Charles |
| 5,663,757 A | 9/1997 | Morales |
| 5,666,487 A | 9/1997 | Goodman et al. |
| 5,666,645 A | 9/1997 | Thomas et al. |
| 5,668,599 A | 9/1997 | Cheney et al. |
| 5,671,267 A | 9/1997 | August et al. |
| 5,673,089 A | 9/1997 | Yuen et al. |
| 5,675,390 A | 10/1997 | Schindler et al. |
| 5,675,575 A | 10/1997 | Wall, Jr. et al. |
| 5,682,195 A | 10/1997 | Hendricks et al. |
| 5,682,511 A | 10/1997 | Sposato et al. |
| 5,684,525 A | 11/1997 | Klosterman |
| 5,684,918 A | 11/1997 | Abecassis |
| 5,687,331 A | 11/1997 | Volk et al. |
| 5,689,501 A | 11/1997 | Takase et al. |
| 5,689,553 A | 11/1997 | Ahuja et al. |
| 5,689,555 A | 11/1997 | Sonnenberg |
| 5,689,663 A | 11/1997 | Williams |
| 5,692,214 A | 11/1997 | Levine |
| 5,694,176 A | 12/1997 | Bruette et al. |
| 5,696,815 A | 12/1997 | Smyk |
| 5,696,906 A | 12/1997 | Peters et al. |
| 5,699,107 A | 12/1997 | Lawler et al. |
| 5,701,383 A | 12/1997 | Russo et al. |
| 5,701,610 A | 12/1997 | Hsu |
| 5,703,877 A | 12/1997 | Nuber et al. |
| 5,703,965 A | 12/1997 | Fu et al. |
| 5,706,342 A | 1/1998 | Baeder et al. |
| 5,708,961 A | 1/1998 | Hylton et al. |
| 5,710,601 A | 1/1998 | Marshall et al. |
| 5,710,610 A | 1/1998 | Kim |
| 5,712,907 A | 1/1998 | Wegner et al. |
| 5,714,273 A | 2/1998 | Wake et al. |
| 5,715,315 A | 2/1998 | Handelman |
| 5,715,515 A | 2/1998 | Akins, III et al. |
| 5,716,273 A | 2/1998 | Yuen |
| 5,719,646 A | 2/1998 | Kikuchi et al. |
| 5,721,956 A | 2/1998 | Martin et al. |
| 5,724,091 A | 3/1998 | Freeman et al. |
| 5,724,203 A | 3/1998 | Kwoh et al. |
| 5,724,355 A | 3/1998 | Bruno et al. |
| 5,724,411 A | 3/1998 | Eisdorfer et al. |
| 5,724,412 A | 3/1998 | Srinivasan |
| 5,724,521 A | 3/1998 | Dedrick |
| 5,724,525 A | 3/1998 | Beyers, II et al. |
| 5,724,543 A | 3/1998 | Ozden et al. |
| 5,724,646 A | 3/1998 | Ganek et al. |
| 5,727,060 A | 3/1998 | Young |
| 5,727,065 A | 3/1998 | Dillon |
| 5,729,471 A | 3/1998 | Jain et al. |
| 5,729,549 A | 3/1998 | Kostreski et al. |
| 5,731,844 A | 3/1998 | Rauch et al. |
| 5,732,217 A | 3/1998 | Emura |
| 5,734,589 A | 3/1998 | Kostreski et al. |
| 5,734,853 A | 3/1998 | Hendricks et al. |
| 5,737,333 A | 4/1998 | Civanlar et al. |
| 5,737,533 A | 4/1998 | de Hond |
| 5,737,725 A | 4/1998 | Case |
| 5,740,230 A | 4/1998 | Vaudreuil |
| 5,740,231 A | 4/1998 | Cohn et al. |
| 5,742,596 A | 4/1998 | Baratz et al. |
| 5,742,680 A | 4/1998 | Wilson |
| 5,742,905 A | 4/1998 | Pepe et al. |
| 5,744,170 A | 4/1998 | Hall |
| 5,745,556 A | 4/1998 | Ronen |
| 5,745,710 A | 4/1998 | Clanton, III et al. |
| 5,745,882 A | 4/1998 | Bixler et al. |
| 5,751,282 A | 5/1998 | Girard et al. |
| 5,751,706 A | 5/1998 | Land et al. |
| 5,751,760 A | 5/1998 | Fuller et al. |
| 5,754,775 A | 5/1998 | Adamson et al. |
| 5,754,783 A | 5/1998 | Mendelson et al. |
| 5,754,938 A | 5/1998 | Herz et al. |
| 5,754,940 A | 5/1998 | Smith et al. |
| 5,757,416 A | 5/1998 | Birch et al. |
| 5,758,257 A | 5/1998 | Herz et al. ............ 725/116 |
| 5,758,259 A | 5/1998 | Lawler |
| 5,764,276 A | 6/1998 | Martin et al. |
| 5,764,739 A | 6/1998 | Patton et al. |
| 5,764,752 A | 6/1998 | Waite et al. |
| 5,768,491 A | 6/1998 | Lobodzinski et al. |
| 5,768,513 A | 6/1998 | Kuthyar et al. |
| 5,768,539 A | 6/1998 | Metz et al. |
| 5,768,551 A | 6/1998 | Bleiweiss et al. |
| 5,771,064 A | 6/1998 | Lett |
| 5,774,122 A | 6/1998 | Kojima et al. |
| 5,774,170 A | 6/1998 | Hite |
| 5,778,173 A | 7/1998 | Apte |
| 5,780,474 A | 7/1998 | Peglion et al. |
| 5,781,228 A | 7/1998 | Sposato |
| 5,784,095 A | 7/1998 | Robbins et al. |
| 5,784,444 A | 7/1998 | Snyder et al. |
| 5,787,171 A | 7/1998 | Kubota et al. |
| 5,790,172 A | 8/1998 | Imanaka |
| 5,790,198 A | 8/1998 | Roop et al. |
| 5,790,806 A | 8/1998 | Koperda |
| 5,793,364 A | 8/1998 | Bolanos et al. |
| 5,793,410 A | 8/1998 | Rao |
| 5,793,413 A | 8/1998 | Hylton et al. |
| 5,793,438 A | 8/1998 | Bedard |
| 5,793,872 A | 8/1998 | Hirayama et al. |
| 5,796,394 A | 8/1998 | Wicks et al. |
| 5,796,424 A | 8/1998 | Ely et al. |
| 5,796,718 A | 8/1998 | Caterisano |
| 5,796,952 A | 8/1998 | Davis et al. |
| 5,798,785 A * | 8/1998 | Hendricks ............ H04H 20/42 348/E5.002 |
| 5,798,795 A | 8/1998 | Glenn et al. |
| 5,799,157 A | 8/1998 | Escallon |
| 5,801,747 A | 9/1998 | Bedard |
| 5,801,753 A | 9/1998 | Eyer et al. |

(56) References Cited

U.S. PATENT DOCUMENTS

| | | |
|---|---|---|
| 5,801,787 A | 9/1998 | Schein et al. |
| 5,802,045 A | 9/1998 | Kos et al. |
| 5,802,063 A | 9/1998 | Deiss |
| 5,802,160 A | 9/1998 | Kugell et al. |
| 5,802,510 A | 9/1998 | Jones |
| 5,805,155 A | 9/1998 | Allibhoy et al. |
| 5,805,204 A | 9/1998 | Thompson et al. |
| 5,805,587 A | 9/1998 | Norris et al. |
| 5,805,677 A | 9/1998 | Ferry et al. |
| 5,805,762 A | 9/1998 | Boyce et al. |
| 5,805,763 A | 9/1998 | Lawler et al. |
| 5,806,061 A | 9/1998 | Chaudhuri et al. |
| 5,808,608 A | 9/1998 | Young et al. |
| 5,809,128 A | 9/1998 | McMullin |
| 5,809,204 A | 9/1998 | Young et al. |
| 5,812,123 A | 9/1998 | Rowe et al. |
| 5,812,205 A | 9/1998 | Milnes et al. |
| 5,812,754 A | 9/1998 | Lui et al. |
| 5,812,786 A | 9/1998 | Seazholtz et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,511 A | 10/1998 | Farry et al. |
| 5,819,301 A | 10/1998 | Rowe et al. |
| 5,822,123 A | 10/1998 | Davis et al. |
| 5,822,324 A | 10/1998 | Kostresti et al. |
| 5,825,829 A | 10/1998 | Borazjani et al. |
| 5,825,862 A | 10/1998 | Voit et al. |
| 5,826,110 A | 10/1998 | Ozden et al. |
| 5,828,420 A | 10/1998 | Marshall et al. |
| 5,828,945 A | 10/1998 | Klosterman |
| RE35,954 E | 11/1998 | Levine |
| 5,829,733 A | 11/1998 | Becker |
| 5,832,221 A | 11/1998 | Jones |
| 5,833,468 A | 11/1998 | Guy et al. |
| 5,835,087 A | 11/1998 | Herz et al. |
| 5,835,792 A | 11/1998 | Wise et al. |
| 5,838,368 A | 11/1998 | Masunaga et al. |
| 5,838,383 A | 11/1998 | Chimoto et al. |
| 5,838,678 A | 11/1998 | Davis et al. |
| 5,838,873 A | 11/1998 | Blatter et al. |
| 5,841,433 A | 11/1998 | Chaney |
| 5,844,600 A | 12/1998 | Kerr |
| 5,844,620 A | 12/1998 | Coleman et al. |
| 5,844,890 A | 12/1998 | Delp et al. |
| 5,847,771 A | 12/1998 | Cloutier et al. |
| 5,848,396 A | 12/1998 | Gerace |
| 5,850,218 A | 12/1998 | LaJoie et al. |
| 5,850,232 A | 12/1998 | Engstrom et al. |
| 5,850,340 A | 12/1998 | York |
| 5,850,429 A | 12/1998 | Joyce et al. |
| 5,852,478 A | 12/1998 | Kwoh |
| 5,854,840 A | 12/1998 | Cannella, Jr. |
| 5,855,020 A | 12/1998 | Kirsch |
| 5,859,660 A | 1/1999 | Perkins et al. |
| 5,859,895 A | 1/1999 | Pomp et al. |
| 5,859,902 A | 1/1999 | Freedman |
| 5,859,949 A | 1/1999 | Yanagihara |
| 5,861,881 A | 1/1999 | Freeman et al. |
| 5,861,906 A | 1/1999 | Dunn et al. |
| 5,864,546 A | 1/1999 | Campanella |
| 5,867,208 A | 2/1999 | McLaren |
| 5,867,495 A | 2/1999 | Elliott et al. |
| 5,870,150 A | 2/1999 | Yuen |
| 5,870,474 A | 2/1999 | Wasilewski et al. |
| 5,870,565 A | 2/1999 | Glitho |
| 5,877,801 A | 3/1999 | Martin et al. |
| 5,880,768 A | 3/1999 | Lemmons et al. |
| 5,880,769 A | 3/1999 | Nemirofsky et al. |
| 5,883,677 A | 3/1999 | Hofmann |
| 5,883,942 A | 3/1999 | Lim et al. |
| 5,887,259 A | 3/1999 | Zicker et al. |
| 5,890,122 A | 3/1999 | Van Kleeck et al. |
| 5,892,508 A | 4/1999 | Howe et al. |
| 5,894,328 A | 4/1999 | Negishi |
| 5,894,504 A | 4/1999 | Alfred et al. |
| 5,896,444 A | 4/1999 | Perlman et al. |
| 5,898,668 A | 4/1999 | Shaffer |
| 5,898,780 A | 4/1999 | Liu et al. |
| RE36,207 E | 5/1999 | Zimmermann et al. |
| 5,903,314 A | 5/1999 | Niijima et al. |
| 5,903,319 A | 5/1999 | Busko et al. |
| 5,903,816 A | 5/1999 | Broadwin et al. |
| 5,907,323 A | 5/1999 | Lawler et al. |
| 5,907,547 A | 5/1999 | Foladare et al. |
| 5,907,598 A | 5/1999 | Mandalia et al. |
| 5,907,604 A | 5/1999 | Hsu |
| 5,909,638 A | 6/1999 | Allen |
| 5,912,952 A | 6/1999 | Brendzel |
| 5,912,962 A | 6/1999 | Bosco |
| 5,914,757 A | 6/1999 | Dean et al. |
| 5,915,068 A | 6/1999 | Levine |
| 5,916,302 A | 6/1999 | Dunn et al. |
| 5,917,537 A | 6/1999 | Lightfoot et al. |
| 5,917,553 A | 6/1999 | Honey et al. |
| 5,917,624 A | 6/1999 | Wagner |
| 5,917,830 A | 6/1999 | Chen et al. |
| 5,917,915 A | 6/1999 | Hirose |
| 5,920,705 A | 7/1999 | Lyon et al. |
| 5,923,731 A | 7/1999 | McClure |
| 5,926,230 A | 7/1999 | Niijima et al. |
| 5,928,335 A | 7/1999 | Morita |
| 5,929,849 A | 7/1999 | Kikinis |
| 5,929,932 A | 7/1999 | Otsuki et al. |
| 5,930,340 A | 7/1999 | Bell |
| 5,933,141 A | 8/1999 | Smith |
| 5,940,073 A | 8/1999 | Klosterman et al. |
| 5,940,738 A | 8/1999 | Rao |
| 5,944,795 A | 8/1999 | Civanlar |
| 5,945,987 A | 8/1999 | Dunn |
| 5,946,381 A | 8/1999 | Danne et al. |
| 5,946,386 A | 8/1999 | Rogers et al. |
| 5,949,476 A | 9/1999 | Pocock et al. |
| 5,949,792 A | 9/1999 | Yasuda et al. |
| 5,951,639 A | 9/1999 | MacInnis |
| 5,953,458 A | 9/1999 | Pirson et al. |
| 5,956,088 A | 9/1999 | Shen et al. |
| 5,956,716 A | 9/1999 | Kenner et al. |
| 5,956,717 A | 9/1999 | Kraay et al. |
| 5,957,695 A | 9/1999 | Redford et al. |
| 5,965,088 A | 10/1999 | Lever et al. |
| 5,966,120 A | 10/1999 | Arazi et al. |
| 5,966,162 A | 10/1999 | Goode et al. |
| 5,970,072 A | 10/1999 | Gammenthaler, Jr. et al. |
| 5,970,473 A | 10/1999 | Gerszberg et al. |
| 5,978,043 A | 11/1999 | Blonstein et al. |
| 5,978,470 A | 11/1999 | Shaffer et al. |
| 5,978,855 A | 11/1999 | Metz et al. |
| 5,982,445 A | 11/1999 | Eyer et al. |
| 5,982,774 A | 11/1999 | Foladare et al. |
| 5,982,784 A | 11/1999 | Bell |
| 5,983,176 A | 11/1999 | Hoffert et al. |
| 5,986,650 A | 11/1999 | Ellis et al. |
| 5,986,690 A | 11/1999 | Hendricks ......................... 348/7 |
| 5,987,100 A | 11/1999 | Fortman et al. |
| 5,987,245 A | 11/1999 | Gish |
| 5,987,508 A | 11/1999 | Agraharam et al. |
| 5,990,927 A | 11/1999 | Hendricks et al. |
| 5,990,972 A | 11/1999 | Bond-Harris et al. |
| 5,991,380 A | 11/1999 | Bruno et al. |
| 5,991,735 A | 11/1999 | Gerace |
| 5,991,799 A | 11/1999 | Yen et al. |
| 5,995,095 A | 11/1999 | Ratakonda |
| 5,995,606 A | 11/1999 | Civanlar et al. |
| 5,999,173 A | 12/1999 | Ubillos |
| 5,999,525 A | 12/1999 | Krishnaswamy et al. |
| 5,999,598 A | 12/1999 | Henrick et al. |
| 5,999,602 A | 12/1999 | Yang et al. |
| 5,999,612 A | 12/1999 | Dunn et al. |
| 6,002,394 A | 12/1999 | Schein et al. |
| 6,002,444 A | 12/1999 | Marshall et al. |
| 6,005,561 A | 12/1999 | Hawkins et al. |

(56) References Cited

U.S. PATENT DOCUMENTS

| | | | |
|---|---|---|---|
| 6,005,562 A | 12/1999 | Shiga et al. | |
| 6,005,565 A | 12/1999 | Legall et al. | |
| 6,005,601 A | 12/1999 | Ohkura et al. | |
| 6,005,631 A | 12/1999 | Anderson et al. | |
| 6,005,861 A | 12/1999 | Humpleman | |
| 6,005,873 A | 12/1999 | Amit | |
| 6,006,225 A * | 12/1999 | Bowman | G06F 17/30395 707/5 |
| 6,006,253 A | 12/1999 | Kumar et al. | |
| 6,006,256 A | 12/1999 | Zdepski et al. | |
| 6,008,803 A | 12/1999 | Rowe et al. | |
| 6,009,410 A | 12/1999 | LeMole et al. | |
| 6,011,909 A | 1/2000 | Newlin et al. | |
| 6,014,184 A | 1/2000 | Knee et al. | |
| 6,014,368 A | 1/2000 | Sanami | |
| 6,014,427 A | 1/2000 | Hanson et al. | |
| 6,016,141 A | 1/2000 | Knudson et al. | |
| 6,016,144 A | 1/2000 | Blonstein et al. | |
| 6,016,336 A | 1/2000 | Hanson | |
| 6,018,372 A | 1/2000 | Etheredge | |
| 6,020,915 A | 2/2000 | Bruno et al. | |
| 6,022,223 A | 2/2000 | Taniguchi et al. | |
| 6,023,724 A | 2/2000 | Bhatia et al. | |
| 6,025,637 A | 2/2000 | Mehta | |
| 6,025,837 A | 2/2000 | Matthews, III et al. | |
| 6,026,441 A | 2/2000 | Ronen | |
| 6,028,848 A | 2/2000 | Bhatia et al. | |
| 6,028,867 A | 2/2000 | Rawson et al. | |
| 6,029,045 A | 2/2000 | Picco | |
| 6,031,680 A | 2/2000 | Chainer et al. | |
| 6,031,896 A | 2/2000 | Gardell et al. | |
| 6,031,899 A | 2/2000 | Wu | |
| 6,031,906 A | 2/2000 | Rao | |
| 6,034,677 A | 3/2000 | Noguchi et al. | |
| 6,038,000 A | 3/2000 | Hurst, Jr. | |
| 6,038,233 A | 3/2000 | Hamamoto et al. | |
| 6,040,867 A | 3/2000 | Bando et al. | |
| 6,044,396 A | 3/2000 | Adams | |
| 6,044,403 A | 3/2000 | Gerszberg et al. | |
| 6,047,063 A | 4/2000 | Perry | |
| 6,049,594 A | 4/2000 | Furman et al. | |
| 6,049,831 A | 4/2000 | Gardell et al. | |
| 6,052,444 A | 4/2000 | Ferry et al. | |
| 6,052,594 A | 4/2000 | Chuang et al. | |
| 6,052,717 A | 4/2000 | Reynolds et al. | |
| 6,052,725 A | 4/2000 | McCann et al. | |
| 6,061,097 A | 5/2000 | Satterfield | |
| 6,061,399 A | 5/2000 | Lyons et al. | |
| 6,061,434 A | 5/2000 | Corbett | |
| 6,061,451 A | 5/2000 | Muratani et al. | |
| 6,062,868 A | 5/2000 | Toriumi | |
| 6,064,376 A | 5/2000 | Berezowski et al. | |
| 6,069,879 A | 5/2000 | Chatter | |
| 6,075,575 A | 6/2000 | Schein et al. | |
| 6,075,796 A | 6/2000 | Katseff et al. | |
| 6,078,886 A | 6/2000 | Dragosh et al. | |
| 6,084,292 A | 7/2000 | Shinohara | |
| 6,085,231 A | 7/2000 | Agraharam et al. | |
| 6,088,368 A | 7/2000 | Rubinstain et al. | |
| 6,088,732 A | 7/2000 | Smith et al. | |
| 6,094,680 A | 7/2000 | Hokanson | |
| 6,099,320 A | 8/2000 | Papadopoulos | |
| 6,101,246 A | 8/2000 | Heinmiller et al. | |
| 6,101,324 A | 8/2000 | Connell et al. | |
| 6,104,391 A | 8/2000 | Johnston, Jr. et al. | |
| 6,104,704 A | 8/2000 | Buhler et al. | |
| 6,104,800 A | 8/2000 | Benson | |
| 6,108,330 A | 8/2000 | Bhatia et al. | |
| 6,115,393 A | 9/2000 | Engel et al. | |
| 6,118,432 A | 9/2000 | Kotorov et al. | |
| 6,118,768 A | 9/2000 | Bhatia et al. | |
| 6,118,778 A | 9/2000 | Amin | |
| 6,118,784 A | 9/2000 | Tsuchiya et al. | |
| 6,119,154 A | 9/2000 | Weaver et al. | |
| 6,119,454 A | 9/2000 | Valisko | |
| 6,122,357 A | 9/2000 | Farris et al. | |
| 6,125,376 A | 9/2000 | Klarlund et al. | |
| 6,128,009 A | 10/2000 | Ohkura et al. | |
| 6,128,304 A | 10/2000 | Gardell et al. | |
| 6,130,898 A | 10/2000 | Kostreski et al. | |
| 6,131,161 A | 10/2000 | Linnartz | |
| 6,134,235 A | 10/2000 | Goldman et al. | |
| 6,137,870 A | 10/2000 | Scherer | |
| 6,138,100 A | 10/2000 | Dutton et al. | |
| 6,138,147 A | 10/2000 | Weaver et al. | |
| 6,141,003 A | 10/2000 | Chor et al. | |
| 6,141,385 A | 10/2000 | Yamaji | |
| 6,141,448 A | 10/2000 | Khansari et al. | |
| 6,141,693 A | 10/2000 | Perlman et al. | |
| 6,144,401 A | 11/2000 | Casement et al. | |
| 6,144,667 A | 11/2000 | Doshi et al. | |
| 6,144,944 A | 11/2000 | Kurtzman, II et al. | |
| 6,147,714 A | 11/2000 | Terasawa et al. | |
| 6,148,067 A | 11/2000 | Leipow | |
| 6,151,059 A | 11/2000 | Schein et al. | |
| 6,154,531 A | 11/2000 | Clapper | |
| 6,154,633 A | 11/2000 | Landgraf et al. | |
| RE36,988 E | 12/2000 | Johnson et al. | |
| 6,157,673 A | 12/2000 | Cuccia | |
| 6,160,545 A | 12/2000 | Eyer et al. | |
| 6,160,546 A | 12/2000 | Thompson et al. | |
| 6,160,880 A | 12/2000 | Allen | |
| 6,163,316 A | 12/2000 | Killian | |
| 6,163,345 A | 12/2000 | Noguchi et al. | |
| 6,163,531 A | 12/2000 | Kumar | |
| 6,166,778 A | 12/2000 | Yamamoto et al. | |
| 6,167,043 A | 12/2000 | Frantz | |
| 6,167,188 A | 12/2000 | Young et al. | |
| 6,169,843 B1 | 1/2001 | Lenihan et al. | |
| 6,172,674 B1 | 1/2001 | Etheredge | |
| 6,172,677 B1 | 1/2001 | Stautner et al. | |
| 6,172,687 B1 | 1/2001 | Kitamura et al. | |
| 6,173,250 B1 | 1/2001 | Jong | |
| 6,173,330 B1 | 1/2001 | Guo et al. | |
| 6,175,619 B1 | 1/2001 | DeSimone | |
| 6,177,930 B1 | 1/2001 | Chernock et al. | |
| 6,177,931 B1 | 1/2001 | Alexander et al. | |
| 6,178,446 B1 | 1/2001 | Gerszberg et al. | |
| 6,182,028 B1 * | 1/2001 | Karaali | G10L 15/18 704/10 |
| 6,182,050 B1 | 1/2001 | Ballard | |
| 6,182,072 B1 | 1/2001 | Leak et al. | |
| 6,182,287 B1 | 1/2001 | Schneidewend et al. | |
| 6,185,288 B1 | 2/2001 | Wong | |
| 6,188,725 B1 | 2/2001 | Sugiyama | |
| 6,188,756 B1 | 2/2001 | Mashinsky | |
| 6,191,782 B1 | 2/2001 | Mori et al. | |
| 6,192,116 B1 | 2/2001 | Mayak | |
| 6,198,478 B1 | 3/2001 | Ota et al. | |
| 6,201,536 B1 * | 3/2001 | Hendricks | H04H 20/38 348/E5.002 |
| 6,201,797 B1 | 3/2001 | Leuca et al. | |
| 6,204,885 B1 | 3/2001 | Kwoh | |
| 6,208,335 B1 | 3/2001 | Gordon et al. | |
| 6,209,028 B1 | 3/2001 | Walker et al. | |
| 6,209,129 B1 | 3/2001 | Carr et al. | |
| 6,209,130 B1 | 3/2001 | Rector, Jr. et al. | |
| 6,212,680 B1 | 4/2001 | Tsinberg et al. | |
| 6,212,860 B1 | 4/2001 | Preisner et al. | |
| 6,219,839 B1 | 4/2001 | Sampsell | |
| 6,222,531 B1 | 4/2001 | Smith | |
| 6,229,810 B1 | 5/2001 | Gerszberg et al. | |
| 6,229,887 B1 | 5/2001 | Albers et al. | |
| 6,230,322 B1 | 5/2001 | Saib et al. | |
| 6,230,324 B1 | 5/2001 | Tomita et al. | |
| 6,233,226 B1 | 5/2001 | Gringeri et al. | |
| 6,233,235 B1 | 5/2001 | Burke et al. | |
| 6,233,313 B1 | 5/2001 | Farris et al. | |
| 6,239,794 B1 | 5/2001 | Yuen et al. | |
| 6,240,555 B1 | 5/2001 | Shoff et al. | |
| 6,243,142 B1 | 6/2001 | Mugura et al. | |
| 6,243,388 B1 | 6/2001 | Mussman et al. | |
| 6,243,445 B1 | 6/2001 | Begeja et al. | |

(56) References Cited

U.S. PATENT DOCUMENTS

| | | | |
|---|---|---|---|
| 6,243,713 B1 * | 6/2001 | Nelson | G06F 17/30017 707/104.1 |
| 6,252,690 B1 | 6/2001 | Laine | |
| 6,252,952 B1 | 6/2001 | Kung et al. | |
| 6,256,785 B1 | 7/2001 | Klappert et al. | |
| 6,259,487 B1 | 7/2001 | Bril | |
| 6,260,192 B1 | 7/2001 | Rosin et al. | |
| 6,262,722 B1 | 7/2001 | Allison et al. | |
| 6,262,979 B1 | 7/2001 | Anderson et al. | |
| 6,263,065 B1 | 7/2001 | Durinovic-Johri et al. | |
| 6,263,501 B1 | 7/2001 | Schein et al. | |
| 6,263,503 B1 | 7/2001 | Margulis | |
| 6,266,340 B1 | 7/2001 | Pickett et al. | |
| 6,266,405 B1 | 7/2001 | Madour et al. | |
| 6,268,849 B1 | 7/2001 | Boyer et al. | |
| 6,279,112 B1 | 8/2001 | O'Toole, Jr. et al. | |
| 6,282,713 B1 | 8/2001 | Kitsukawa et al. | |
| 6,285,750 B1 | 9/2001 | Brachman et al. | |
| 6,286,006 B1 | 9/2001 | Bharat et al. | |
| 6,288,738 B1 | 9/2001 | Dureau et al. | |
| 6,288,753 B1 | 9/2001 | DeNicola et al. | |
| 6,289,025 B1 | 9/2001 | Pang et al. | |
| 6,292,553 B1 | 9/2001 | Fellingham et al. | |
| 6,295,298 B1 | 9/2001 | Hrastar et al. | |
| 6,298,120 B1 | 10/2001 | Civanlar et al. | |
| 6,298,482 B1 | 10/2001 | Seidman et al. | |
| 6,300,947 B1 | 10/2001 | Kanevsky | |
| 6,304,566 B1 | 10/2001 | Schessel | |
| 6,304,573 B1 | 10/2001 | Hicks, III | |
| 6,304,636 B1 | 10/2001 | Goldberg et al. | |
| 6,305,016 B1 | 10/2001 | Marshall et al. | |
| 6,310,889 B1 | 10/2001 | Parsons et al. | |
| 6,312,336 B1 | 11/2001 | Handelman et al. | |
| 6,317,684 B1 | 11/2001 | Roeseler et al. | |
| 6,317,884 B1 | 11/2001 | Eames et al. | |
| 6,324,279 B1 | 11/2001 | Kalmanek, Jr. et al. | |
| 6,327,346 B1 | 12/2001 | Infosino | |
| 6,327,574 B1 | 12/2001 | Kramer et al. | |
| 6,331,877 B1 | 12/2001 | Bennington et al. | |
| 6,332,139 B1 | 12/2001 | Kaneko et al. | |
| 6,333,931 B1 | 12/2001 | LaPier et al. | |
| 6,339,594 B1 | 1/2002 | Civanlar et al. | |
| 6,343,074 B1 | 1/2002 | Pickett | |
| 6,343,115 B1 | 1/2002 | Foladare et al. | |
| 6,347,075 B1 | 2/2002 | Barzegar et al. | |
| 6,351,464 B1 | 2/2002 | Galvin et al. | |
| 6,353,611 B1 | 3/2002 | Norris et al. | |
| 6,356,546 B1 | 3/2002 | Beshai | |
| 6,357,043 B1 | 3/2002 | Ellis et al. | |
| 6,357,046 B1 | 3/2002 | Thompson et al. | |
| 6,359,881 B1 | 3/2002 | Gerszberg et al. | |
| 6,359,910 B1 | 3/2002 | Takahashi | |
| 6,363,411 B1 | 3/2002 | Dugan et al. | |
| 6,366,578 B1 | 4/2002 | Johnson | |
| 6,370,543 B2 | 4/2002 | Hoffert et al. | |
| 6,373,817 B1 | 4/2002 | Kung et al. | |
| 6,374,124 B1 | 4/2002 | Slabinski | |
| 6,385,202 B1 | 5/2002 | Katseff et al. | |
| 6,385,646 B1 | 5/2002 | Brown et al. | |
| 6,385,771 B1 | 5/2002 | Gordon | |
| 6,388,714 B1 | 5/2002 | Schein et al. | |
| 6,389,114 B1 | 5/2002 | Dowens et al. | |
| 6,389,477 B1 | 5/2002 | Simmon et al. | |
| 6,393,014 B1 | 5/2002 | Daly et al. | |
| 6,393,017 B1 | 5/2002 | Galvin et al. | |
| 6,401,242 B1 | 6/2002 | Eyer et al. | |
| 6,404,735 B1 | 6/2002 | Beshai et al. | |
| 6,404,818 B1 | 6/2002 | Obikane | |
| 6,405,371 B1 | 6/2002 | Oosterhout et al. | |
| 6,414,970 B1 | 7/2002 | Negishi et al. | |
| 6,415,437 B1 | 7/2002 | Ludvig et al. | |
| 6,418,139 B1 | 7/2002 | Akhtar | |
| 6,418,146 B1 | 7/2002 | Miloslavsky | |
| 6,418,433 B1 | 7/2002 | Chakrabarti et al. | |
| 6,421,067 B1 | 7/2002 | Kamen et al. | |
| 6,421,359 B1 | 7/2002 | Bennett et al. | |
| 6,421,425 B1 | 7/2002 | Bossi et al. | |
| 6,424,646 B1 | 7/2002 | Gerszberg et al. | |
| 6,425,131 B2 | 7/2002 | Crandall et al. | |
| 6,425,133 B1 | 7/2002 | Leary | |
| 6,426,779 B1 | 7/2002 | Noguchi et al. | |
| 6,437,692 B1 | 8/2002 | Petite et al. | |
| 6,438,222 B1 | 8/2002 | Burg | |
| 6,438,223 B1 | 8/2002 | Eskafi et al. | |
| 6,442,266 B1 | 8/2002 | Wu | |
| 6,442,755 B1 | 8/2002 | Lemmons et al. | |
| 6,446,261 B1 | 9/2002 | Rosser | |
| 6,449,654 B1 | 9/2002 | Blackwell et al. | |
| 6,449,766 B1 | 9/2002 | Fleming | |
| 6,452,923 B1 | 9/2002 | Gerszberg et al. | |
| 6,453,471 B1 | 9/2002 | Klosterman | |
| 6,456,699 B1 | 9/2002 | Burg et al. | |
| 6,456,782 B1 | 9/2002 | Kubota et al. | |
| 6,457,010 B1 | 9/2002 | Eldering et al. | |
| 6,459,427 B1 | 10/2002 | Mao et al. | |
| 6,459,913 B2 | 10/2002 | Cloutier | |
| 6,460,018 B1 | 10/2002 | Kasai et al. | |
| 6,460,181 B1 | 10/2002 | Donnelly | |
| 6,463,468 B1 | 10/2002 | Buch et al. | |
| 6,463,585 B1 | 10/2002 | Hendricks et al. | |
| 6,463,586 B1 | 10/2002 | Jerding | |
| 6,466,970 B1 | 10/2002 | Lee et al. | |
| 6,467,090 B1 | 10/2002 | Brodigan | |
| 6,469,753 B1 | 10/2002 | Klosterman et al. | |
| 6,470,460 B1 | 10/2002 | Kashiwagi et al. | |
| 6,473,425 B1 | 10/2002 | Bellaton et al. | |
| 6,473,804 B1 | 10/2002 | Kaiser et al. | |
| 6,477,705 B1 | 11/2002 | Yuen et al. | |
| 6,480,748 B1 | 11/2002 | Gerszberg et al. | |
| 6,481,010 B2 | 11/2002 | Nishikawa et al. | |
| 6,481,011 B1 | 11/2002 | Lemmons | |
| 6,481,012 B1 | 11/2002 | Gordon et al. | |
| 6,486,892 B1 | 11/2002 | Stern | |
| 6,487,722 B1 | 11/2002 | Okura et al. | |
| 6,490,274 B1 | 12/2002 | Kim | |
| 6,490,728 B1 | 12/2002 | Kitazato et al. | |
| 6,493,324 B1 | 12/2002 | Truetken | |
| 6,493,872 B1 | 12/2002 | Rangan et al. | |
| 6,501,740 B1 | 12/2002 | Sun et al. | |
| 6,505,348 B1 | 1/2003 | Knowles et al. | |
| 6,510,152 B1 | 1/2003 | Gerszberg et al. | |
| 6,510,555 B1 | 1/2003 | Tsurumoto | |
| 6,515,680 B1 | 2/2003 | Hendricks et al. | |
| 6,518,986 B1 | 2/2003 | Mugura | |
| 6,519,009 B1 | 2/2003 | Hanaya et al. | |
| 6,519,246 B1 | 2/2003 | Strahs | |
| 6,519,249 B1 | 2/2003 | Bennefeld et al. | |
| 6,522,628 B1 | 2/2003 | Patel et al. | |
| 6,526,577 B1 | 2/2003 | Knudson et al. | |
| 6,530,082 B1 | 3/2003 | Del Sesto et al. | |
| 6,532,286 B1 | 3/2003 | Burg | |
| 6,532,590 B1 | 3/2003 | Chimoto | |
| 6,539,548 B1 | 3/2003 | Hendricks et al. | |
| 6,542,500 B1 | 4/2003 | Gerszberg et al. | |
| 6,542,518 B1 | 4/2003 | Miyazawa | |
| 6,547,829 B1 | 4/2003 | Meyerzon et al. | |
| 6,560,222 B1 | 5/2003 | Pounds et al. | |
| 6,567,106 B1 | 5/2003 | Wugofski | |
| 6,570,855 B1 | 5/2003 | Kung et al. | |
| 6,570,974 B1 | 5/2003 | Gerszberg et al. | |
| 6,573,942 B1 | 6/2003 | Crinon | |
| 6,577,350 B1 | 6/2003 | Proehl et al. | |
| 6,578,201 B1 | 6/2003 | LaRocca et al. | |
| 6,580,441 B2 | 6/2003 | Schileru-Key | |
| 6,584,125 B1 | 6/2003 | Katto | |
| 6,584,153 B1 | 6/2003 | Gordon et al. | |
| 6,588,014 B1 | 7/2003 | Hayashi | |
| 6,590,867 B1 | 7/2003 | Ash et al. | |
| 6,594,271 B1 | 7/2003 | Wu et al. | |
| 6,606,746 B1 | 8/2003 | Zdepski et al. | |
| 6,618,717 B1 | 9/2003 | Karadimitriou et al. | |
| 6,621,870 B1 | 9/2003 | Gordon et al. | |
| 6,625,810 B1 | 9/2003 | Murphy et al. | |
| 6,633,635 B2 | 10/2003 | Kung et al. | |

(56) References Cited

U.S. PATENT DOCUMENTS

| | | | |
|---|---|---|---|
| 6,633,848 B1 | 10/2003 | Johnson et al. |
| 6,637,029 B1 | 10/2003 | Maissel et al. |
| 6,638,314 B1 | 10/2003 | Meyerzon et al. |
| 6,640,239 B1 | 10/2003 | Gidwani |
| 6,650,901 B1 | 11/2003 | Schuster et al. |
| 6,651,252 B1 | 11/2003 | Gordon et al. |
| 6,651,253 B2 * | 11/2003 | Dudkiewicz ...... G06F 17/30017 348/E5.006 |
| 6,671,882 B1 | 12/2003 | Murphy et al. |
| 6,675,385 B1 | 1/2004 | Wang |
| 6,675,387 B1 | 1/2004 | Boucher et al. |
| 6,681,395 B1 | 1/2004 | Nishi |
| 6,687,360 B2 | 2/2004 | Kung et al. |
| 6,690,675 B1 | 2/2004 | Kung et al. |
| 6,694,352 B1 | 2/2004 | Omoigui |
| 6,698,020 B1 | 2/2004 | Zigmond et al. |
| 6,704,028 B2 | 3/2004 | Wugofski |
| 6,704,359 B1 | 3/2004 | Bayrakeri et al. |
| 6,741,617 B2 | 5/2004 | Rosengren et al. |
| 6,744,767 B1 | 6/2004 | Chiu et al. |
| 6,751,612 B1 | 6/2004 | Schuetze et al. |
| 6,754,905 B2 | 6/2004 | Gordon et al. |
| 6,763,522 B1 | 7/2004 | Kondo et al. |
| 6,771,742 B2 | 8/2004 | McCalmont et al. |
| 6,772,150 B1 | 8/2004 | Whitman et al. |
| 6,775,267 B1 | 8/2004 | Kung et al. |
| 6,782,132 B1 | 8/2004 | Fogg |
| 6,791,561 B1 | 9/2004 | Dawson |
| 6,807,528 B1 | 10/2004 | Truman et al. |
| 6,826,173 B1 | 11/2004 | Kung et al. |
| 6,828,993 B1 | 12/2004 | Hendricks et al. |
| 6,836,476 B1 | 12/2004 | Dunn et al. |
| 6,839,705 B1 | 1/2005 | Grooters |
| 6,874,129 B2 | 3/2005 | Smith |
| 6,918,131 B1 | 7/2005 | Rautila et al. |
| 6,940,950 B2 | 9/2005 | Dickinson et al. |
| 6,954,897 B1 | 10/2005 | Noguchi et al. |
| 6,968,567 B1 | 11/2005 | Gordon et al. |
| 6,973,436 B1 | 12/2005 | Shkedi |
| 6,986,154 B1 | 1/2006 | Price et al. |
| 6,999,476 B2 | 2/2006 | Lerman et al. |
| 7,006,614 B2 | 2/2006 | Feinberg et al. |
| 7,027,564 B2 | 4/2006 | James |
| 7,042,985 B1 | 5/2006 | Wright |
| 7,054,313 B2 | 5/2006 | Gerszberg et al. |
| 7,062,777 B2 | 6/2006 | Alba et al. |
| 7,065,709 B2 | 6/2006 | Ellis et al. |
| 7,075,919 B1 | 7/2006 | Wendt et al. |
| 7,082,427 B1 | 7/2006 | Seibel et al. |
| 7,096,484 B2 | 8/2006 | Mao et al. |
| 7,099,443 B2 | 8/2006 | Phillips et al. |
| 7,100,185 B2 | 8/2006 | Bennington et al. |
| 7,110,006 B2 | 9/2006 | MacInnis et al. |
| 7,110,395 B2 | 9/2006 | Blair |
| 7,117,440 B2 | 10/2006 | Gordon et al. |
| 7,127,044 B1 | 10/2006 | Becker et al. |
| 7,134,133 B1 | 11/2006 | Wugofski |
| 7,137,135 B2 | 11/2006 | Schein et al. |
| 7,143,428 B1 | 11/2006 | Bruck et al. |
| 7,143,430 B1 | 11/2006 | Fingerman et al. |
| 7,149,499 B1 | 12/2006 | Oran et al. |
| 7,150,029 B1 | 12/2006 | Ebling et al. |
| 7,150,031 B1 | 12/2006 | Rodriguez et al. |
| 7,174,084 B2 | 2/2007 | Edmonds et al. |
| 7,177,399 B2 | 2/2007 | Dawson et al. |
| 7,178,158 B2 | 2/2007 | Nishina et al. |
| 7,180,988 B2 | 2/2007 | Phillips et al. |
| 7,181,401 B2 | 2/2007 | Johnson et al. |
| 7,194,032 B1 | 3/2007 | Easwar et al. |
| 7,239,698 B2 | 7/2007 | Phillips et al. |
| 7,257,387 B2 | 8/2007 | Laliberte |
| 7,260,186 B2 | 8/2007 | Zhu et al. |
| 7,315,881 B2 | 1/2008 | Menez |
| 7,343,614 B1 | 3/2008 | Hendricks et al. |
| 7,363,645 B1 | 4/2008 | Hendricks |
| 7,366,157 B1 | 4/2008 | Valentine et al. |
| 7,370,342 B2 | 5/2008 | Ismail et al. |
| 7,379,436 B2 | 5/2008 | Jiang |
| 7,379,455 B2 | 5/2008 | Pickett |
| 7,391,761 B1 | 6/2008 | Ruckart et al. |
| 7,404,200 B1 | 7/2008 | Hailey et al. |
| 7,424,439 B1 | 9/2008 | Fayyad et al. |
| 7,453,990 B2 | 11/2008 | Welenson et al. |
| 7,474,742 B2 | 1/2009 | Cook |
| 7,496,360 B2 | 2/2009 | Sindhwani et al. |
| 7,503,003 B2 | 3/2009 | Kamen et al. |
| 7,505,919 B2 | 3/2009 | Richardson |
| 7,508,928 B1 | 3/2009 | Everson et al. |
| 7,573,988 B2 | 8/2009 | Lee et al. |
| 7,580,405 B2 | 8/2009 | Laliberte |
| 7,586,902 B2 | 9/2009 | Epley |
| 7,685,619 B1 | 3/2010 | Herz |
| 7,746,905 B2 | 6/2010 | Binder |
| 7,796,738 B2 | 9/2010 | Wright |
| 7,836,467 B2 | 11/2010 | Gordon et al. |
| 7,838,467 B2 | 11/2010 | Jones et al. |
| 7,843,923 B2 | 11/2010 | Baum |
| 7,843,934 B2 | 11/2010 | Baum et al. |
| 7,940,746 B2 | 5/2011 | Livingood |
| 8,032,906 B2 | 10/2011 | Gordon et al. |
| 8,060,905 B1 | 11/2011 | Hendricks |
| 8,265,587 B2 | 9/2012 | D'Evelyn et al. |
| 2001/0004382 A1 | 6/2001 | Van Wonterghem |
| 2001/0010095 A1 | 7/2001 | Ellis et al. |
| 2001/0012022 A1 | 8/2001 | Smith |
| 2001/0013123 A1 | 8/2001 | Freeman et al. |
| 2001/0027493 A1 | 10/2001 | Wallace |
| 2001/0027557 A1 | 10/2001 | Shinkawa et al. |
| 2001/0037498 A1 | 11/2001 | Johansson |
| 2001/0039546 A1 | 11/2001 | Moore et al. |
| 2001/0056577 A1 | 12/2001 | Gordon et al. |
| 2002/0007493 A1 | 1/2002 | Butler et al. |
| 2002/0010682 A1 | 1/2002 | Johnson |
| 2002/0012353 A1 | 1/2002 | Gerszberg et al. |
| 2002/0013941 A1 | 1/2002 | Ward et al. |
| 2002/0026496 A1 | 2/2002 | Boyer et al. |
| 2002/0032740 A1 | 3/2002 | Stern et al. |
| 2002/0032907 A1 | 3/2002 | Daniels |
| 2002/0035728 A1 | 3/2002 | Fries |
| 2002/0038308 A1 * | 3/2002 | Cappi ............... G06F 17/30566 707/104.1 |
| 2002/0049971 A1 | 4/2002 | Augenbraun et al. |
| 2002/0056112 A1 | 5/2002 | Dureau et al. |
| 2002/0056129 A1 | 5/2002 | Blackketter et al. |
| 2002/0059610 A1 | 5/2002 | Ellis |
| 2002/0065812 A1 | 5/2002 | Keith, Jr. |
| 2002/0065935 A1 | 5/2002 | Koperda et al. |
| 2002/0066102 A1 | 5/2002 | Chapman et al. |
| 2002/0066103 A1 | 5/2002 | Gagnon et al. |
| 2002/0087980 A1 | 7/2002 | Eldering et al. |
| 2002/0099697 A1 | 7/2002 | Jensen-Grey |
| 2002/0100046 A1 * | 7/2002 | Dudkiewicz ........... H04N 7/163 725/46 |
| 2002/0120933 A1 | 8/2002 | Knudson et al. |
| 2002/0129062 A1 | 9/2002 | Luparello |
| 2002/0147880 A1 | 10/2002 | Wang Baldonado |
| 2003/0020744 A1 | 1/2003 | Ellis et al. |
| 2003/0033299 A1 | 2/2003 | Sundaresan |
| 2003/0034982 A1 | 2/2003 | Talayssat et al. |
| 2003/0035007 A1 | 2/2003 | Wugofski |
| 2003/0052905 A1 | 3/2003 | Gordon et al. |
| 2003/0056216 A1 | 3/2003 | Wugofski et al. |
| 2003/0066085 A1 | 4/2003 | Boyer et al. |
| 2003/0081377 A1 | 5/2003 | Lin |
| 2003/0083533 A1 | 5/2003 | Gerba et al. |
| 2003/0091339 A1 | 5/2003 | Isozaki |
| 2003/0115603 A1 | 6/2003 | Lemmons et al. |
| 2003/0149988 A1 | 8/2003 | Ellis et al. |
| 2003/0200544 A1 | 10/2003 | Ellis et al. |
| 2003/0204393 A1 | 10/2003 | Czerwiec et al. |
| 2003/0209599 A1 | 11/2003 | Gatto |
| 2003/0214939 A1 | 11/2003 | Eldumiati et al. |
| 2004/0001479 A1 | 1/2004 | Pounds et al. |
| 2004/0001501 A1 | 1/2004 | Delveaux et al. |

(56) References Cited

U.S. PATENT DOCUMENTS

| | | |
|---|---|---|
| 2004/0057425 A1 | 3/2004 | Brouwer et al. |
| 2004/0073597 A1 | 4/2004 | Caveney et al. |
| 2004/0078824 A1 | 4/2004 | Krisbergh et al. |
| 2004/0096110 A1 | 5/2004 | Yogeshwar et al. |
| 2004/0107439 A1 | 6/2004 | Hassell et al. |
| 2004/0117831 A1 | 6/2004 | Ellis et al. |
| 2004/0125819 A1 | 7/2004 | Binder |
| 2004/0128686 A1 | 7/2004 | Boyer et al. |
| 2004/0140928 A1 | 7/2004 | Cleghorn |
| 2004/0151168 A1 | 8/2004 | Phillips et al. |
| 2004/0151290 A1 | 8/2004 | Magarasevic et al. |
| 2004/0153577 A1 | 8/2004 | Phillips et al. |
| 2004/0176085 A1 | 9/2004 | Phillips et al. |
| 2004/0203896 A1 | 10/2004 | Deigin et al. |
| 2004/0261105 A1 | 12/2004 | Marshall et al. |
| 2004/0261127 A1 | 12/2004 | Freeman et al. |
| 2005/0023520 A1 | 2/2005 | Lee et al. |
| 2005/0028208 A1 | 2/2005 | Ellis et al. |
| 2005/0083912 A1 | 4/2005 | Afshar et al. |
| 2005/0138660 A1 | 6/2005 | Boyer et al. |
| 2005/0141431 A1 | 6/2005 | Caveney et al. |
| 2005/0144645 A1 | 6/2005 | Casey et al. |
| 2005/0213565 A1 | 9/2005 | Barclay et al. |
| 2005/0213716 A1 | 9/2005 | Zhu et al. |
| 2005/0235200 A1 | 10/2005 | Goldberg |
| 2005/0243973 A1 | 11/2005 | Laliberte |
| 2005/0278741 A1 | 12/2005 | Robarts et al. |
| 2006/0056388 A1 | 3/2006 | Livingood |
| 2006/0120517 A1 | 6/2006 | Moon et al. |
| 2006/0188073 A1 | 8/2006 | Wright |
| 2006/0282852 A1 | 12/2006 | Purpura et al. |
| 2006/0293024 A1 | 12/2006 | Benco et al. |
| 2007/0011702 A1 | 1/2007 | Vaysman |
| 2007/0013516 A1 | 1/2007 | Freitag et al. |
| 2007/0089135 A1 | 4/2007 | Qureshey et al. |
| 2007/0092070 A1 | 4/2007 | Croy et al. |
| 2007/0147345 A1 | 6/2007 | Lowmaster |
| 2007/0259645 A1 | 11/2007 | Laliberte |
| 2009/0028153 A1 | 1/2009 | Koster et al. |
| 2009/0274145 A1 | 11/2009 | Laliberte |
| 2010/0029246 A1 | 2/2010 | Binning |
| 2011/0069183 A1 | 3/2011 | Edwards et al. |
| 2011/0116420 A1 | 5/2011 | Livingood |
| 2012/0013702 A1 | 1/2012 | Livingood |

FOREIGN PATENT DOCUMENTS

| | | |
|---|---|---|
| DE | 3935294 A1 | 4/1991 |
| DE | 4214184 A1 | 11/1992 |
| DE | 19755742 A1 | 6/1999 |
| EP | 103438 A1 | 3/1984 |
| EP | 145063 A2 | 6/1985 |
| EP | 149536 A2 | 7/1985 |
| EP | 158548 A1 | 10/1985 |
| EP | 0158767 A2 | 10/1985 |
| EP | 167237 A2 | 1/1986 |
| EP | 187961 A2 | 7/1986 |
| EP | 243312 A2 | 10/1987 |
| EP | 0277014 A2 | 8/1988 |
| EP | 0281293 A2 | 9/1988 |
| EP | 0299830 A1 | 1/1989 |
| EP | 0314572 A2 | 5/1989 |
| EP | 0328440 A1 | 8/1989 |
| EP | 0340643 A2 | 11/1989 |
| EP | 0 355 697 | 2/1990 |
| EP | 0377334 A2 | 7/1990 |
| EP | 0390041 A2 | 10/1990 |
| EP | 0396186 A1 | 11/1990 |
| EP | 399200 A2 | 11/1990 |
| EP | 0402809 A2 | 12/1990 |
| EP | 0420123 A2 | 4/1991 |
| EP | 0424648 A2 | 5/1991 |
| EP | 0424648 A2 | 5/1991 |
| EP | 425834 A2 | 5/1991 |
| EP | 450841 A2 | 10/1991 |
| EP | 0486989 A1 | 5/1992 |
| EP | 0488379 A2 | 6/1992 |
| EP | 0506435 A2 | 9/1992 |
| EP | 0513553 A2 | 11/1992 |
| EP | 513763 A2 | 11/1992 |
| EP | 0570785 A1 | 11/1993 |
| EP | 0586954 A2 | 3/1994 |
| EP | 0620689 | 10/1994 |
| EP | 0646856 A2 | 4/1995 |
| EP | 0 691 787 | 1/1996 |
| EP | 0702491 A1 | 3/1996 |
| EP | 0721253 A2 | 7/1996 |
| EP | 0725539 A2 | 8/1996 |
| EP | 0734157 A2 | 9/1996 |
| EP | 0821522 A2 | 1/1998 |
| EP | 0/838958 A1 | 4/1998 |
| EP | 0835915 A2 | 4/1998 |
| EP | 0838798 A1 | 4/1998 |
| EP | 0845904 A2 | 6/1998 |
| EP | 0892388 A1 | 1/1999 |
| EP | 0924629 A2 | 6/1999 |
| EP | 0924687 A2 | 6/1999 |
| EP | 0 961 490 | 12/1999 |
| EP | 0966164 A2 | 12/1999 |
| EP | 0 992 922 | 4/2000 |
| EP | 1 049 305 | 11/2000 |
| EP | 1 133 088 | 9/2001 |
| EP | 1 143 728 | 10/2001 |
| EP | 1444825 A2 | 8/2004 |
| GB | 235095 A | 6/1925 |
| GB | 2168227 A | 6/1986 |
| GB | 2177873 A | 1/1987 |
| GB | 2255214 A | 10/1992 |
| GB | 2259830 A | 3/1993 |
| GB | 2269302 A | 2/1994 |
| GB | 2 330 429 | 4/1999 |
| GB | 2 343 095 | 4/2000 |
| GB | 2353095 A | 2/2001 |
| GB | 2 358 938 | 8/2001 |
| GB | 2344009 A | 9/2010 |
| JP | 60143086 A | 7/1985 |
| JP | 61-202587 A | 9/1986 |
| JP | 01-020454 A | 1/1989 |
| JP | 1130683 A | 5/1989 |
| JP | 1142918 A | 6/1989 |
| JP | 3029456 A | 2/1991 |
| JP | 3114375 A | 5/1991 |
| JP | 3198119 A | 8/1991 |
| JP | 4233886 A | 8/1992 |
| JP | 5250106 A | 9/1993 |
| JP | 6-134489 A | 5/1994 |
| JP | 6224777 A | 8/1994 |
| JP | 7-235909 A | 9/1995 |
| JP | 09227193 A | 9/1997 |
| JP | 9-284571 A | 10/1997 |
| JP | 2000-013779 | 1/2000 |
| JP | 2001-119681 | 4/2001 |
| WO | 8000209 A1 | 2/1980 |
| WO | 8801463 A1 | 2/1988 |
| WO | 8909528 A1 | 10/1989 |
| WO | 8912370 A1 | 12/1989 |
| WO | 9010988 A1 | 9/1990 |
| WO | WO91/00670 | 1/1991 |
| WO | 9103112 A1 | 3/1991 |
| WO | 9204801 A1 | 3/1992 |
| WO | 9210040 A1 | 6/1992 |
| WO | 9211713 A1 | 7/1992 |
| WO | 9212599 A1 | 7/1992 |
| WO | WO92/17027 | 10/1992 |
| WO | 9221206 A1 | 11/1992 |
| WO | 9311637 A1 | 6/1993 |
| WO | 9322877 A2 | 11/1993 |
| WO | 9407327 A1 | 3/1994 |
| WO | 9413107 A1 | 6/1994 |
| WO | 9414282 A1 | 6/1994 |
| WO | WO 94/16527 | 7/1994 |
| WO | 94/30008 A1 | 12/1994 |
| WO | 9515658 A1 | 6/1995 |

(56) References Cited

FOREIGN PATENT DOCUMENTS

| WO | WO 96/08109 | 3/1996 |
|---|---|---|
| WO | 9617306 A2 | 6/1996 |
| WO | 9625006 A1 | 8/1996 |
| WO | 9641473 A1 | 12/1996 |
| WO | 9713368 A1 | 4/1997 |
| WO | WO 97/12486 | 4/1997 |
| WO | 9720274 A1 | 6/1997 |
| WO | 9722110 A1 | 6/1997 |
| WO | 9722112 A1 | 6/1997 |
| WO | 9741688 A1 | 11/1997 |
| WO | 9746007 A1 | 12/1997 |
| WO | 9802836 A2 | 1/1998 |
| WO | 9808344 A2 | 2/1998 |
| WO | 9810997 A1 | 3/1998 |
| WO | 9818086 A1 | 4/1998 |
| WO | 9828906 A2 | 7/1998 |
| WO | 9848566 A2 | 10/1998 |
| WO | 9853581 A1 | 11/1998 |
| WO | 9853611 A1 | 11/1998 |
| WO | 99/14947 | 3/1999 |
| WO | 99/17549 | 4/1999 |
| WO | 9918701 A1 | 4/1999 |
| WO | WO 99/26415 | 5/1999 |
| WO | 9945491 A1 | 9/1999 |
| WO | WO 99/52285 | 10/1999 |
| WO | WO 99/66719 | 12/1999 |
| WO | 00/08855 | 2/2000 |
| WO | 0005890 A1 | 2/2000 |
| WO | 0005892 A1 | 2/2000 |
| WO | 00/27122 | 5/2000 |
| WO | 00/28733 | 5/2000 |
| WO | 0064164 A1 | 10/2000 |
| WO | 0064169 A1 | 10/2000 |
| WO | 00/79794 A2 | 12/2000 |
| WO | 0101689 | 1/2001 |
| WO | 0111874 A1 | 2/2001 |
| WO | 0118665 A1 | 3/2001 |
| WO | 0124083 A2 | 4/2001 |
| WO | 0167207 A2 | 9/2001 |
| WO | 0167763 A1 | 9/2001 |
| WO | 0175649 A2 | 10/2001 |
| WO | 01/99426 A2 | 12/2001 |

OTHER PUBLICATIONS

Sergey Brin et al., "The Anatomy of a Large-Scale Hypertextual Web Search Engine", Aug. 3, 2001, pp. 1-19.
Chadwick, Henry, et al., "DAVIC—Digital Audio-Visual Council", TV Anytime and TV anywhere, Dec. 1999, pp. 1-140.
EP Search Report, EP Application No. 02800962.9, Dated Jul. 26, 2010.
US Non-Final Office Action, U.S. Appl. No. 10/724,123, Dated Aug. 27, 2010.
US Non-Final Office Action, U.S. Appl. No. 12/131,551, Dated Sep. 1, 2010.
Office Action received in related JP Application No. 2003-537297, mailed Mar. 17, 2009.
Office Action received in related JP Application No. 2003-535456, mailed Mar. 17, 2009.
Non-Final Office Action received in related U.S. Appl. No. 10/261,931, mailed Jun. 22, 2009.
Non-Final Office Action received in related U.S. Appl. No. 10/724,123, mailed Nov. 6, 2009.
Office Action received in related JP Application No. 2003-537297, mailed Nov. 24, 2009.
Non-Final Office Action received in related U.S. Appl. No. 09/964,891, mailed Mar. 11, 2010.
Non-Final Office Action received in related U.S. Appl. No. 12/487,450, mailed Mar. 19, 2010.
Final Office Action received in related U.S. Appl. No. 10/724,123, mailed Apr. 19, 2010.
Final Office Action received in related U.S. Appl. No. 12/487,450, mailed Sep. 1, 2010.
Notice of Allowance received in related U.S. Appl. No. 10/724,123, mailed Dec. 9, 2010.
Written Opinion received in related PCT Application No. PCT/US02/32756, mailed Aug. 13, 2004.
International Preliminary Examination Report received in related PCT Application No. PCT/US02/32756, dated Feb. 17, 2005.
Supplementary Partial EP Search Report received in related EP Application No. 02 77 8473, mailed Oct. 25, 2005.
Supplementary EP Search Report received in related EP Application No. 02 78 4096, mailed Oct. 13, 2005.
Supplementary EP Search Report received in related EP Application No. 02 77 8472, mailed Oct. 7, 2005.
EP Search Report received in related EP Application No. 02 778 472.7, dated Feb. 15, 2010.
Communication received in related EP Application No. 02 784 096.6, dated Mar. 26, 2010.
Supplementary EP Search Report related in related EP Application No. 02 80 0962, Jul. 26, 2010.
Non-Final Office Action in U.S. Appl. No. 09/920,615 dated Apr. 11, 2011.
Extended European Search Report—EP 11007278.2—Mailing Date: Jan. 8, 2014.
Office Action in Canadian Patent Application No. 2,414,717, dated May 7, 2010.
European Office Action dated Jan. 30, 2012 in EP Application No. 02778473.5.
Notice of Reasons for Rejection dated Jan. 31, 2012 in Japanese Application No. P2009-188618 and English translation hereof.
Office Action in Canadian Patent Application No. 2462159, dated Aug. 2, 2010.
Office Action in Canadian Patent Application No. 2462161, dated Feb. 1, 2011.
Koenen, et al., "MPEG-4: Context and Objectives", Signal Processing Image Communication 9 (1997), pp. 295-304.
Examiner's Report for Canadian Application No. 2,462,160 dated Jan. 20, 2009.
Pereira, et al., "MGEG-4-Opening New Frontiers to Broadcast Services", EBU Technical Review, Spring 1999, pp. 28-35.
European Search Report for EP 02776187.3 dated Apr. 11, 2005.
Office Action in Canadian Patent Application No. 2680673, dated Oct. 7, 2010.
Office Action in Canadian patent application No. 2680673. dated May 24, 2011.
Office Action in European Patent Application No. 07007019.8, dated Oct. 21, 2011.
Rule 69 EPC Communication in European Patent Application No. 07016891.9, dated Aug. 9, 2010.
Search Report and Written Opinion in European Patent Application No. 07016891.9-2202, dated Jul. 5, 2010.
Search Report in European Patent Application No. 07007019.8, dated Feb. 11, 2011.
Freier, Alan O. et al., "The SSL Protocol Version 3.0," Mar. 1996, pp. 1-52, Netscape.
Kaliski. Burton S .. "A Layman's Guide to a Subset of ASN.1, BER and DER," Nov. 1, 1993, pp. 1-38, RSA Laboratories.
Malpani, Am Barish et al., "Simple Certificate Validation Protocol (SCVP)," Jul. 2001, pp. 1-23.
PKCS #7: Cryptographic Message Syntax Standard, Nov. 1993, pp. 1-29, RSA Laboratories.
Office Action in European Application No. 07016891.9-2202, dated Apr. 21, 2010.
Canadian Office Action—CA App. 2,462,161—Dated Nov. 27, 2014.
Response to Canadian Office Action—CA Application 2,462,161—Dated May 26, 2015.
Canadian Office Action—CA Appl. 2,462,161—dated Jul. 16, 2015.

\* cited by examiner

VIDEO AND DIGITAL MULTIMEDIA AGGREGATOR CONTENT SUGGESTION ENGINE

RELATED APPLICATIONS

The following U.S. patents and patent applications are incorporated by reference:

U.S. patent application Ser. No. 08/906,469, filed Aug. 5, 1997, entitled "Reprogrammable Terminal for Suggesting Programs Offered on a Television Program Delivery System," which is now U.S. Pat. No. 6,408,437.

U.S. patent application Ser. No. 08/160,281 filed Dec. 2, 1993, entitled "Terminal for Suggesting Programs Offered on a Television Program Delivery System," which is now U.S. Pat. No. 5,798,785.

U.S. patent application Ser. No. 07/991,074, filed Dec. 9, 1992, entitled "Remote Control for Menu Driven Subscriber Access to Television Programming."

U.S. Pat. No. 5,798,785, entitled "Terminal for Suggesting Programs Offered on a Television Program Delivery System;" U.S. Pat. No. 5,986,690, entitled "Electronic Book Selection and Delivery System;"

The following co-pending patent applications also are incorporated by reference:

patent application Ser. No. 09/191,520, filed Nov. 13, 1998, entitled "Digital Broadcast Program Ordering;"

patent application Ser. No. 09/289,957, filed Apr. 13, 1999, entitled "Electronic Book Alternative Delivery Systems;"

patent application Ser. No. 09/289,956, filed Apr. 13, 1999, entitled "Electronic Book Alternative Delivery Methods;" and patent application entitled "Video and Digital Multimedia Aggregator;" and patent application entitled "Video and Digital Multimedia Aggregator Remote Content Crawler," filed on date herein.

TECHNICAL FIELD

The technical field is television program and digital multimedia delivery systems that incorporate intelligent and flexible program search and delivery mechanisms.

BACKGROUND

Cable television delivery systems greatly expanded the array of programs available to television viewers over that provided by over-the-air broadcast systems. Subsequently, satellite television delivery systems, and in particular, digital satellite broadcast systems further expanded the viewing choices for consumers. In the near future, digital broadcast television systems will provide many more programming choices for consumers.

In addition to television programming delivered through television program delivery systems, other programs and events may be available to consumers. These other programs and events include streaming video sent over wired and unwired, narrowband to broadband services, digital audio programs, and other multimedia data.

Unfortunately, customers are still limited in their television viewing choices by the local and regional nature of television delivery systems. For example, a broadcaster in Boston may provide programming of local interests to people in Massachusetts while a broadcaster in Seattle may provide different programming to people in the Seattle area. A person in Boston generally cannot access Seattle programming, other than programming that is provided at a national level.

In addition to this local/regional market segregation, many other sources of programming and events may not be available in a specific viewing area. These other sources may include audio programming, streaming video, local or closed circuit television programming (e.g., education television programming provided by a state education department) and other programming.

Even if certain programming is available in a local viewing area, a viewer may not be aware of its existence. This situation may be the result of a large array of available programming coupled with a limited program menu or guide. The program guide may be limited in that not all available programming can be listed, some programming changes occur that are not reflected in the program guide, and errors may exist in the program guide. In addition, the more comprehensive the program guide, the harder it is for the viewer to search and navigate the program guide to find a desired program.

SUMMARY

The problems noted above are solved by the video and digital multimedia aggregator system and method described herein. Program content can be packaged and delivered by the system, including video, television, radio, audio, multimedia, computer software, and electronic books, or any content that can be delivered in digital format.

The aggregator comprises a request and results processing server, a search engine server coupled to the request and results processing server and a content acquisition server coupled to the request and results processing server. The request and results processing server receives a request for a program, the search engine server searches for the program and the content acquisition server acquires a program for delivery to the user. The request and results processing server includes a search request processor that receives information related to the user's search request and provides the information to a search results form builder that creates an electronic search request. The search request may be augmented by using a content search suggestion engine to add additional search terms and descriptions to the search request. The aggregator may also include a decoder that decodes program content and program metadata from remote sources for storage at the aggregator, and an encoder that encodes content metadata and programs for delivery to the user. The aggregator may also comprise one or more crawlers, such as a content crawler, to look for program content in the digital communications network.

The search engine server searches at least a local content database. The local content database comprises at least two file types. A content file includes a complete program content file. For example, the 1997 movie Titanic may exist in the local content database as a complete program content file. The complete program content file may also include a reference file or metadata that contains additional information related to the content. Alternatively, the metadata may be contained within the complete program content file itself. Such additional information in the reference file may include: a program description, including program rating, program description, video clips, program length, format (e.g., 4×3 television or 16×9 movies), and other information; billing information and digital rights management information; viewing statistics, including number of times viewed, dates/times viewed, identity of users viewing the program; advertisement information to allow ads to be inserted during viewing of the program; and other information.

The additional information in the reference file and/or the complete program content file may be provided in whole or in part to the system users. For example, the aggregator may provide a program description and accompanying video clips to selected systems users. The reference file and/or the complete program content file may also be used by the aggregator for system administration purposes. For example, billing and digital rights management information may be used to collect appropriate fees from system users and to provide such collected fees to the entities owning rights in the content.

A remote content crawler continually crawls the digital communication network looking for content to provide to the aggregator. The content provided to the aggregator may be stored in a form of an entire content file. For example, the content may include an entire movie, television program or electronic book. Alternatively, the content provided to the aggregator may be a reference to a content file that is stored at, or that will be available at one of the remote locations. For example, the content may be a reference to a future, scheduled live sports event that will be made available to system users. The sports event may be provided for a one time fee, as part of a sports package, for which a fee is collected, or as a free event. In the examples discussed above, the content may be stored at the aggregator, and may subsequently be provided to system users. For the example of the live sports event, the aggregator may store the live sports event and may then provide the sports event as a replay, in addition to facilitating live viewing of the sports event.

To allow a user to maximize use of the video and digital multimedia aggregator, a search suggestion engine may be used to provide suggestions of available content. The search suggestion engine starts by constructing a database of metadata elements or word items. The metadata element database may be constructed by using a crawler that periodically or continually crawls a content metadata database and extracts word items from the content metadata database. The word items are then processed according to a number of factors, including metadata field description, part-of-speech, entries in dictionaries and thesaurus and other factors. The thus-processed word items are indexed, and may be provided with a vector value. A subsequent search request submitted by the user may include search criteria having vector values. A processor within the search suggestion engine compares the vector values to determine if an indexed word item should be included as a suggested search term to be appended to the user's search criteria. A list of suggested content is then generated. The list of suggested items may be ranked and filtered before being provided to the user.

Specifically, in an embodiment, an apparatus for suggesting available content in a digital communications network, comprises a content metadata crawler that searches metadata related to the available content and produces a metadata list, wherein the metadata list comprises a plurality of metadata elements, and wherein each metadata element comprises one or more metadata fields; a suggestion keyword indexer coupled to the content metadata crawler, wherein the suggestion keyword indexer receives the metadata list and indexes the metadata elements; a suggestion database coupled to the suggestion keyword indexer that stores the indexed metadata elements; and a suggestion database processor coupled to the content metadata crawler, the suggestion keyword indexer and the suggestion keyword database, wherein the suggestion database processor searches the suggestion database, based on one or more search request criteria, to produce a list of suggested search criteria that may be used to identify suggested content. The suggestion keyword indexer, comprises an extraction module that extracts and caches a value of each metadata field; a parsing module coupled to the extraction module that parses contents of uniquely identifying metadata fields, wherein the contents of a uniquely identifying field comprises one or more word items; a classifying module coupled to the parsing module that classifies one or more of the one or more word items; a comparison module coupled to the classifying module that compares one or more of the one or more word items to determine a list of related terms; and an index matrix record builder that creates and augments an index matrix record for each of the classified word items.

The apparatus may also include a dictionary database, a thesaurus database and a lexicon database. The comparison module compares a word item to entries in the dictionary database, the thesaurus database and the lexicon database, and the list of related terms includes one or more of a dictionary definition, lexicon data, and one or more synonyms.

The classifying module may comprise one or more computational linguistics tools, such as a rule-based part-of-speech tagging algorithm and a stochastic part-of-speech tagging algorithm, for example. The computational linguistic tools may be used to determine part-of-speech data of a word item. The index matrix record builder then adds the part-of-speech data to the index matrix record for the word item.

The uniquely identifying fields comprise one or more of content type, content title, date of production, rating and parental notice information, performer, artist, writer, author, plot summary, keyword list, and textual content description.

The index matrix builder may comprise a vector assignment module that assigns a word item vector value for a word item, wherein the word item vector value is a measure of similarity between a word item and a related term.

The suggestion database processor may comprise a vector determination module that assigns a search term suggestion vector range to one or more of the search request criteria; and a vector value comparator that compares the search term suggestion vector range and the word item vector value to determine if the word item vector value falls within the suggestion vector range, wherein word items that fall within the suggestion vector range are used to search the suggestion database. The suggestion vector range may be adjustable by a user of the apparatus. For example, the user may change a setting for relative breadth of the suggested content where a narrow setting may result in fewer, more-relevant suggested content items and a broader setting may result in a larger number of broader results.

The apparatus may further comprise a user-defined filter, including a user history filter; a user profile filter; and an approved content access filter, wherein the suggestion database processor processes search results from the suggestion database using the user-defined filter to produce the list of suggested content. The apparatus may also include a ranking module, wherein the ranking module ranks content in the list of suggested content. The ranking module may rank the content according to one or more of a user historical analysis report and similarities to previously accessed content by the user.

A method corresponding to the above apparatus may include the steps of constructing a database of indexed metadata elements; receiving a content search request from a user of a digital communications network; comparing the search request to the database of indexed metadata elements; caching indexed metadata elements that satisfy the search request; retrieving a user profile for the user; filtering the cached metadata elements according to the user profile; ranking the filtered metadata elements; and providing the ranked metadata elements to a search request processor as criteria for returning suggested content.

The step of constructing the database of indexed metadata elements may include opening one or more metadata records in the content metadata database; for a current one of the one or more metadata records, determining if end-of-file has been reached, reading an entire metadata entry of the current metadata record, wherein the current metadata record comprises one or more uniquely identifying fields, and wherein each of the one or more uniquely identifying fields comprises one or more terms, extracting and caching a value for each term for one or more of the one or more uniquely identifying fields, and parsing and caching terms of each of the uniquely identifying fields. The method may further comprise, for each cached term, determining if an index record exists for the cached term; and if no index record exists, creating an index matrix record, and adding the cached value to the index matrix record. The step of creating the index matrix record may comprise determining a part of speech of the term in order to identify additional part of speech data; comparing the term to thesaurus data to determine similar terms, and storing the part-of-speech data and the similar terms as the index matrix record.

DESCRIPTION OF THE DRAWINGS

The detailed description will refer to the following drawings in which like numerals refer to like elements, and in which:

FIG. 6b is a diagram of components of a suggestion keyword indexer used with the search suggestion engine of FIG. 6a;

FIG. 6c is a diagram of components of a suggestion database processor used with the search suggestion engine of FIG. 6a;

DETAILED DESCRIPTION

Figure 1:
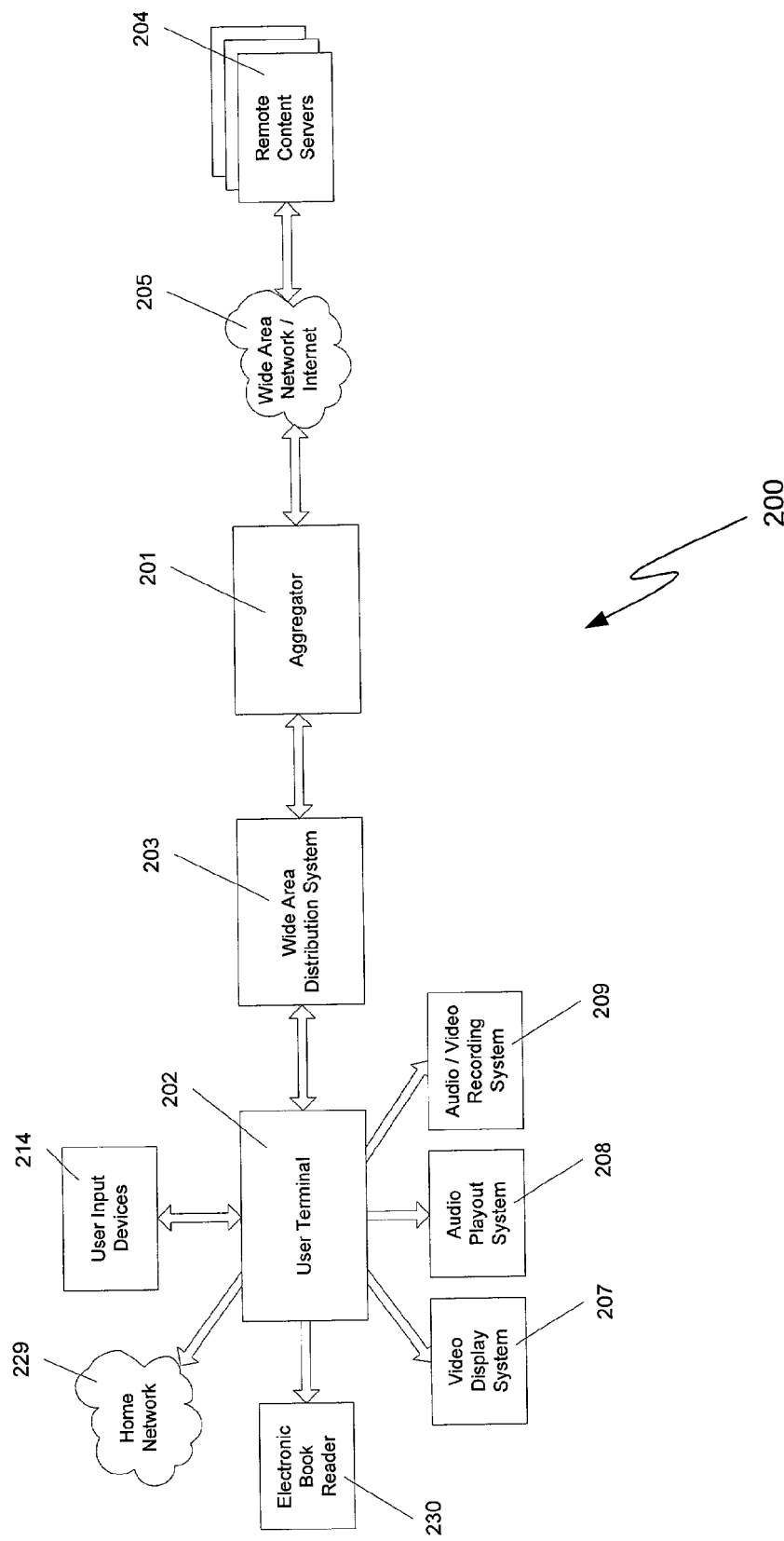
FIG. 1 is a block diagram of primary components of a content search, packaging, and delivery system.

FIG. 1 is a block diagram of a content search, packaging, and delivery system 200. The content to be packaged and delivered by the system 200 includes video, television, radio, audio, multimedia, computer software and electronic books. Components of the system 200 include an aggregator 201 and a user terminal 202, which are connected using a wide area distribution system 203. Other components are remote content servers 204 that exchange data with the aggregator 201 using a wide area network/Internet 205 connection. The user terminal 202 may incorporate a video display system 207, an audio playout system 208, an audio/video recording system 209, user input devices 214, an electronic book reader 230, and a connection to a home network 229 to interact with other devices in the user's home environment. Alternatively, one or more or all of the video display system 207, the audio playout system 208, the audio/video recording system 209, and the electronic book reader 230 may be separate components that are coupled to the user terminal 202.

Figure 4:
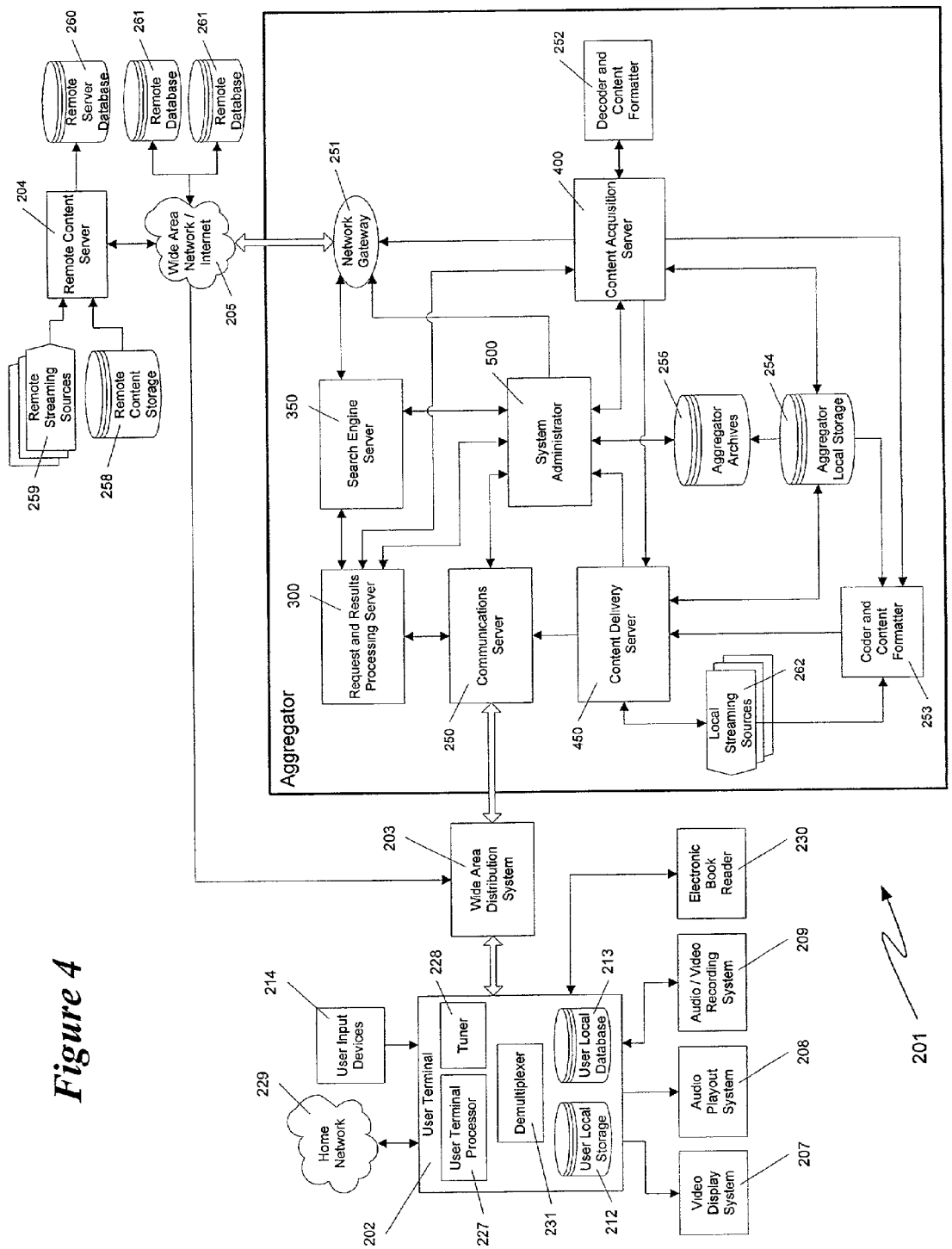
FIG. 4 is a schematic of the components of the content search, packaging, and delivery system showing subsystems of an aggregator, a user terminal, and a remote content server.

The system 200 allows a user to enter search parameters, such as keywords and category headings, and have the aggregator 201 use these parameters to locate, package, and deliver content to the user terminal 202 from numerous sources. The requests and content deliveries can be sent over communications links including, but not limited to, telephone lines, coaxial cable, fiber-optic cable, wireless connections, wide area networks, the Internet, and other communication media collectively represented by the wide area distribution system 203. The numerous sources of content are shown in FIG. 4 and include, but are not limited to, an aggregator local storage 254, local streaming sources 262, remote content storage 258, and remote streaming sources 259. In an embodiment, the local streaming sources 262 are comprised of the audio and video channels being delivered using a cable television headend system that may also house the aggregator 201.

The system 200 will take a user's search request and may perform a search of virtually every active and scheduled radio and television source in the world, as well as archived sources of video and audio programming such as movies and recorded audio sources and sources of other multimedia, software, and electronic book content. In an embodiment, the system 200 will also search Internet Web sites and other online databases. The user will then be able to select programming or other content for download based on the search results. In an embodiment, the download, or delivery, process can be fulfilled by making the content available on a specific channel of a cable television system, or by transmitting the content using a digital communications protocol, such as the Internet standard TCP/IP, for example. In addition, the system 200 is capable of formulating and presenting a list of suggested content based on an analysis of the user's current search parameters, stored information about previous searches and previously selected content downloads and other user-specific or related information. The system 200 is also capable of notifying a user prior to the start time of selected programming and availability of other content using such notification as an electronic mail message and/or an on-screen message indicating that the scheduled program will be broadcast at a specified time. The system 200 may support one or more digital rights management (DRM) systems to track the usage and copyrights associated with downloaded content and bill the user's account as appropriate and provide any license and usage fees to the content provider. The system 200 may also implement a users' privacy protection scheme allowing users to control what information is gathered, limit what is done with that information, and review and delete a user's profile if desired.

Figure 2:
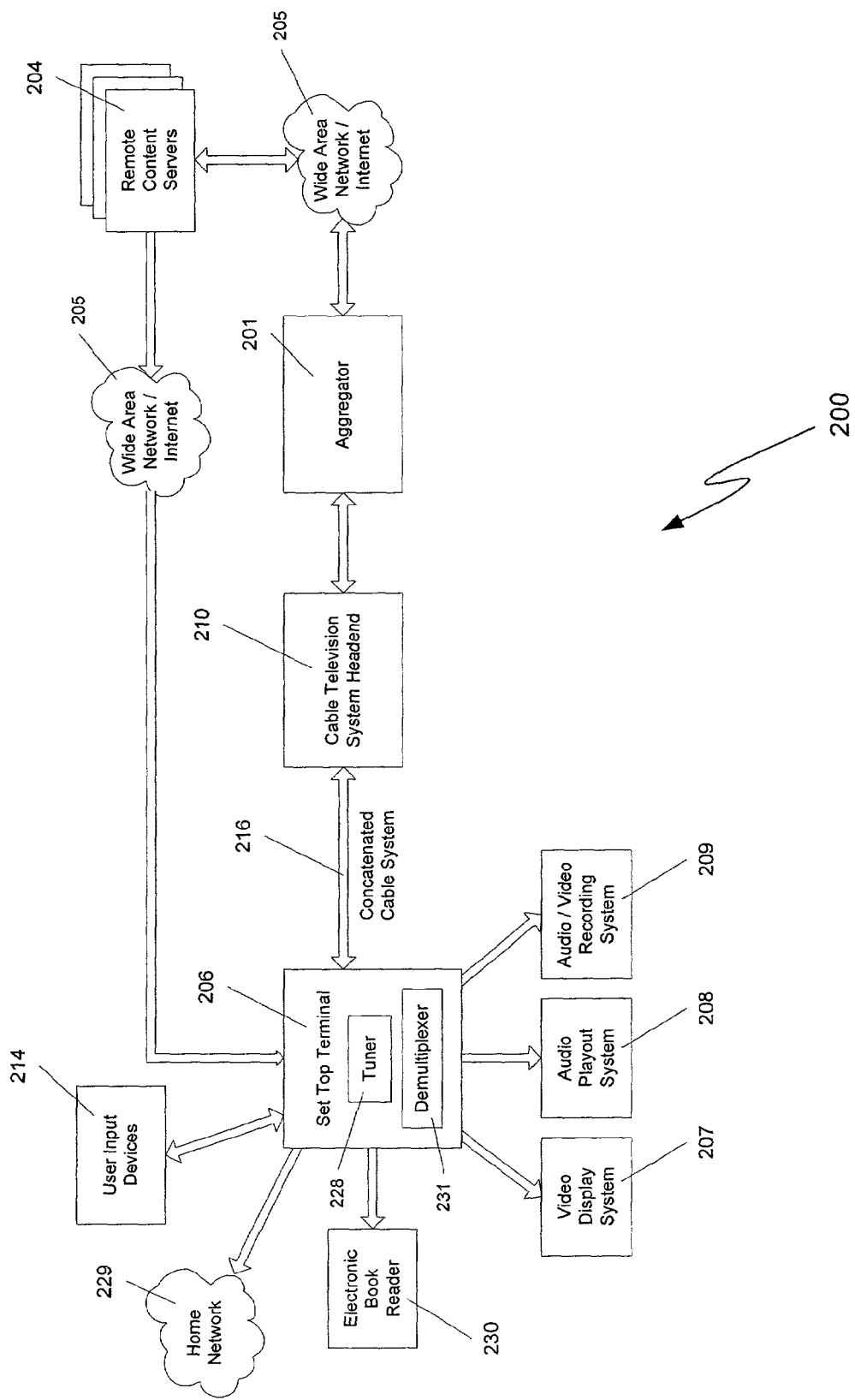
FIG. 2 is a block diagram of the components of the content search, packaging, and delivery system configured to deliver content to a set top terminal.

An overview of an embodiment of the system 200 is shown in FIG. 2 where the user terminal 202 is a set top terminal 206 that communicates with the aggregator 201 through a cable television system headend 210, thereby making use of the cable television system headend 210 high bandwidth concatenated cable system 216. The set top terminal 206 system may include a tuner 228, a demultiplexer 231, the video display system 207, the audio playout system 208, the audio/video recording system 209, user input devices 214, an electronic book reader 230, and a connection to the user's home network 229. These components are used to tune, select, view, listen to, and store audio and video programming and other content delivered by the system 200. FIG. 2 also shows a communications path from one or more remote content servers 204 through the wide area network/Internet 205 directly to the set top terminal 206, which bypasses the aggregator 201 and cable television system headend 210. This path may be used in the case where the requested content is available in the required format from the remote content server 204 and is authorized for direct delivery to the user. In an alternative embodiment, the aggregator 201 is collocated with the cable television system headend 210 that is acting as the wide area distribution system 203 as is the case when a cable television system is also serving as the user's Internet service provider.

Figure 3:
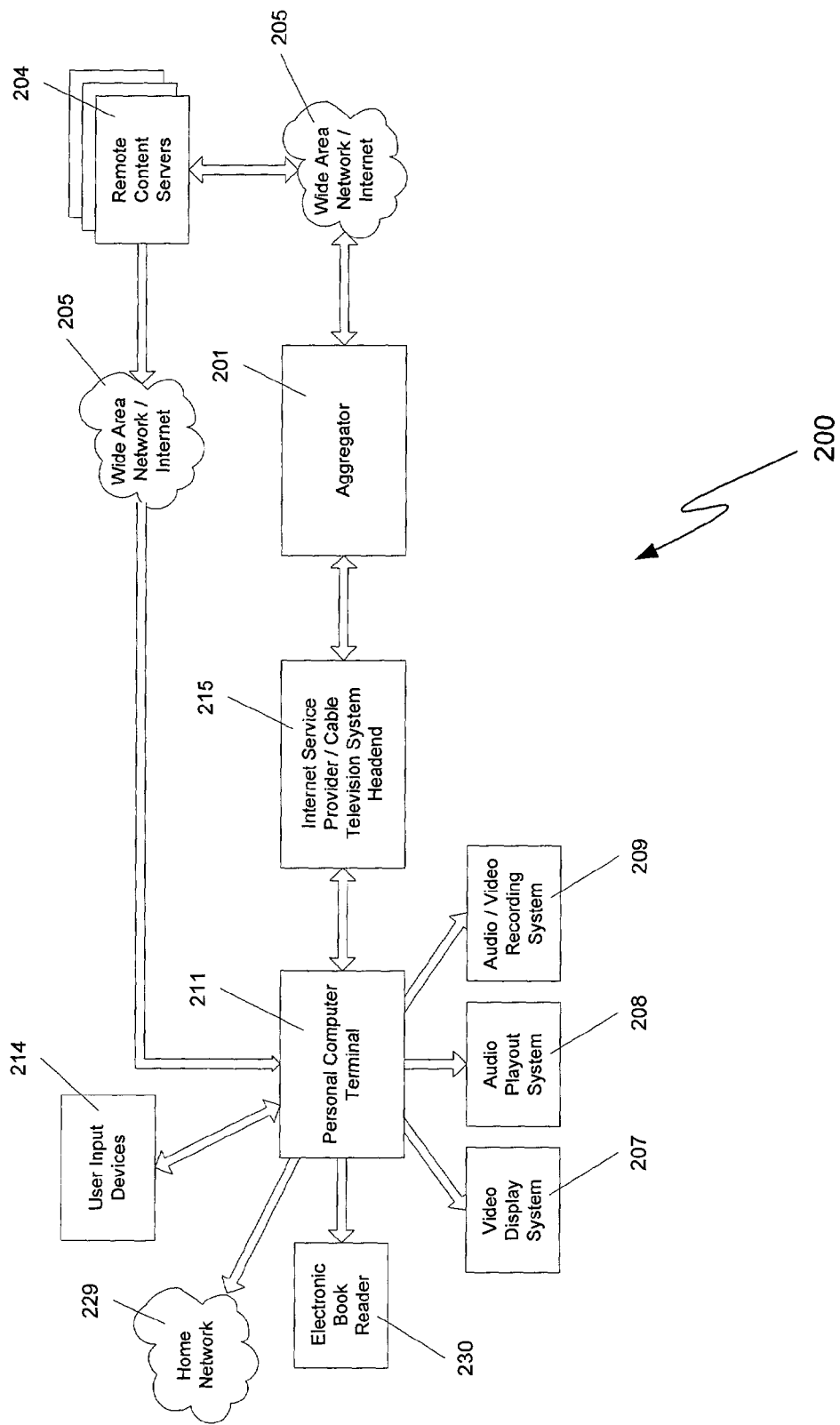
FIG. 3 is a block diagram of the components of the content search, packaging, and delivery system configured to deliver content to a personal computer terminal.

An overview of another embodiment of the system 200 is shown in FIG. 3, where the user terminal 202 is a personal computer terminal 211 that communicates with the aggregator 201 through an Internet service provider/cable television system headend 215. In this case, the content may be delivered by a cable television headend that is operating as an Internet service provider (ISP). The personal computer terminal 211 may also include the video display system 207, the audio playout system 208, the audio/video recording system 209, user input device 214, the electronic book reader 230, and the connection to the home network 229. A communications path may also exist from one or more remote content servers 204 through the wide area network/Internet 205 directly to the personal computer terminal 211. This communications path bypasses the aggregator 201 and the Internet service provider/cable television system headend 215 in the case where requested content is in the required format and is authorized for direct delivery to the user.

The user can receive video and audio programs (i.e., the content) in a number of different ways. First, the tuner 228 in the user terminal 202, shown in FIG. 2, can simply tune to the desired program, or the demultiplexer 231 can select a program from a digital multiplex thereby displaying the program at the appropriate time. However, the desired program may not be broadcast by the user's cable television system headend 210, or the user may want to watch a program that is supplied by the local headend, but not subscribed to by the user, e.g., a boxing match broadcast by a premium channel that the user does not ordinarily receive. In these examples, the program can be delivered to the user by the aggregator 201 using telephone lines, fiber-optic transmission lines, or other communication media, or using the cable television system headend 210. In an embodiment, the aggregator 201 can supply programs by pulling programs from program delivery systems in the United States and abroad and delivering the programs to system users. The aggregator 201 can, therefore, provide a user access to programs outside the user's normal viewing area.

FIG. 4 shows the system 200 and system components in more detail. At a user's location, the user terminal 202 includes the tuner 228, the demultiplexer 231, a user terminal processor 227, user local storage 212 and user local database 213. Coupled to the user terminal 202 may be the user input devices 214, the video display system 207, the audio playout system 208, the audio/video recording system 209, an electronic book reader 230, and a connection to the home network 229.

The user terminal 202 may be coupled through the wide area distribution system 203 to the aggregator 201 and further through the wide area network/Internet 205 to remote program sources. The remote program sources include the remote streaming sources 259 and the remote central storage 258. The remote program sources also include remote databases 261 and, through the remote content server 204, a remote server database 260.

The aggregator 201 may include a communications server 250 that communicates with the user terminal 202 through the wide area distribution system 203. The communications server 250 receives inputs from a request and results processing server 300, a content delivery server 450 and a system administrator 500. The content delivery server 450 receives inputs from a coder and content formatter 253 and a content acquisition server 400. The content delivery server 450 also accesses the aggregator local storage 254 and the local streaming sources 262. Finally, the content delivery server 450 provides an output to the system administrator 500.

The coder and content formatter 253 receives inputs from the content acquisition server 400, the aggregator local storage 254 and the local streaming sources 262. The system administrator 500 receives inputs from the content and delivery server 450, and communicates with the content acquisition server 400, the request and results processing server 300, a search engine server 350, and aggregator archives 255. A decoder and content formatter 252 is coupled to the content acquisition server 400. Finally, a network gateway 251 couples components of the aggregator 201 with the remote content server 204 through the wide area network/Internet 205.

Programs received at the aggregator 201 may be input to the formatter 253. The formatter 253 reformats, as necessary, all input content into a format that is readily received by the user terminals 202 operably connected to the system 200. In addition, the formatter 253 can store full or partial copies of content in compressed form in the aggregator local storage 254. The aggregator 201 can provide real-time delivery of certain content, such as a boxing match. In an embodiment, if a large number of users want a particular live program, then the cable television system headend 210 (see FIG. 2), or similar program source, can broadcast the program on a particular channel available to all the requestors instead of broadcasting the program to each individual user over the wide area distribution system 203. In addition to delivery from a cable television headend, content may be provided by a satellite delivery system, over-the-air-broadcast, and through the Internet. See U.S. patent application Ser. No. 09/191,520, entitled Digital Broadcast Program Ordering, hereby incorporated by reference, for additional details of broadcast program delivery.

The aggregator 201 can also implement a screening process for limiting the number of programs captured to those programs with a viewing audience above a predetermined threshold. The aggregator 201 may contain a filter that will pass only programs meeting the predetermined selection criteria. The filter may include programming that screens the content to reject specific items, such as adult content, for example.

The system administrator 500 records what fees should be paid and to whom. For example, the aggregator 201 will determine to whom any copyright or other fees should be paid when a program is broadcast.

The user terminal 202 may be a television, a set top terminal 206, a personal computer terminal (not shown), or any wired or wireless device capable of receiving digital or analog data, or some combination thereof. The user terminal 202 is equipped with the user input devices 214 that communicate search criteria to the system 200 as well as navigate through the user terminal menu system and control the user terminal's other various functions. The user local storage 212 is used to store and archive content onto one or more removable and/or non-removable storage devices or media for later access. Removable storage media may include, but is not limited to, magnetic tape, magnetic disks, optical disks and modules, and electronic memory cartridges. The user local database 213 may store relevant information about a user's profile and account. This information includes, but is not limited to, user name, password, personal information that the user has authorized for storage, billing information, other users allowed access to the account, past search criteria, past content download information, and library information about stored content. As a consumer protection device, the user terminal 202 may enable the user to view the information stored in the user local database 213 and modify certain data fields and select which data fields may be reported to a main system database (not shown) within the aggregator 201. Certain fields including, but not limited to, account numbers and billing information may not be allowed this level of user access.

The user terminal processor 227 may include a central processing unit and all associated hardware, software, and firmware modules to perform all operations within the user terminal 202. These operations include, but are not limited to, managing communications with the aggregator 201 and other networked devices, processing search and download requests, displaying search and download results, managing and controlling communications with the user local storage 212 and the user local database 213, responding to user interaction with presentation of graphical user interface (GUI) menus, playing out selected programming content using various audio and video output devices, implementing the user's part of the digital rights management schema, and administering the user's account and billing. The tuner 228 and the demultiplexer 231 are used to select an audio/video channel for playout from the channels available on the cable television system 216.

In an embodiment, the user terminal 202 may incorporate selected features of the aggregator 201. For example, the user terminal 202 may include a metadata crawler, an aggregator, and program content and program metadata storage.

The user terminal 202 communicates with the aggregator 201 using the wide area distribution system 203. Within the aggregator 201, the communications server 250 acts as the interface point to the wide area distribution system 203 for the purpose of managing primary communications to system users. The communications server 250 routes incoming user requests and associated user information to the request and results processing server 300, routes search results and content downloads through the wide area distribution system 203 to end users, and routes billing information from the customer billing server (not shown) to the end users. The request and results processing server 300 performs the basic processing and routing related to user search requests, content download requests, administrative information requests, search results, related content suggestions, and programming notification.

Figure 5:
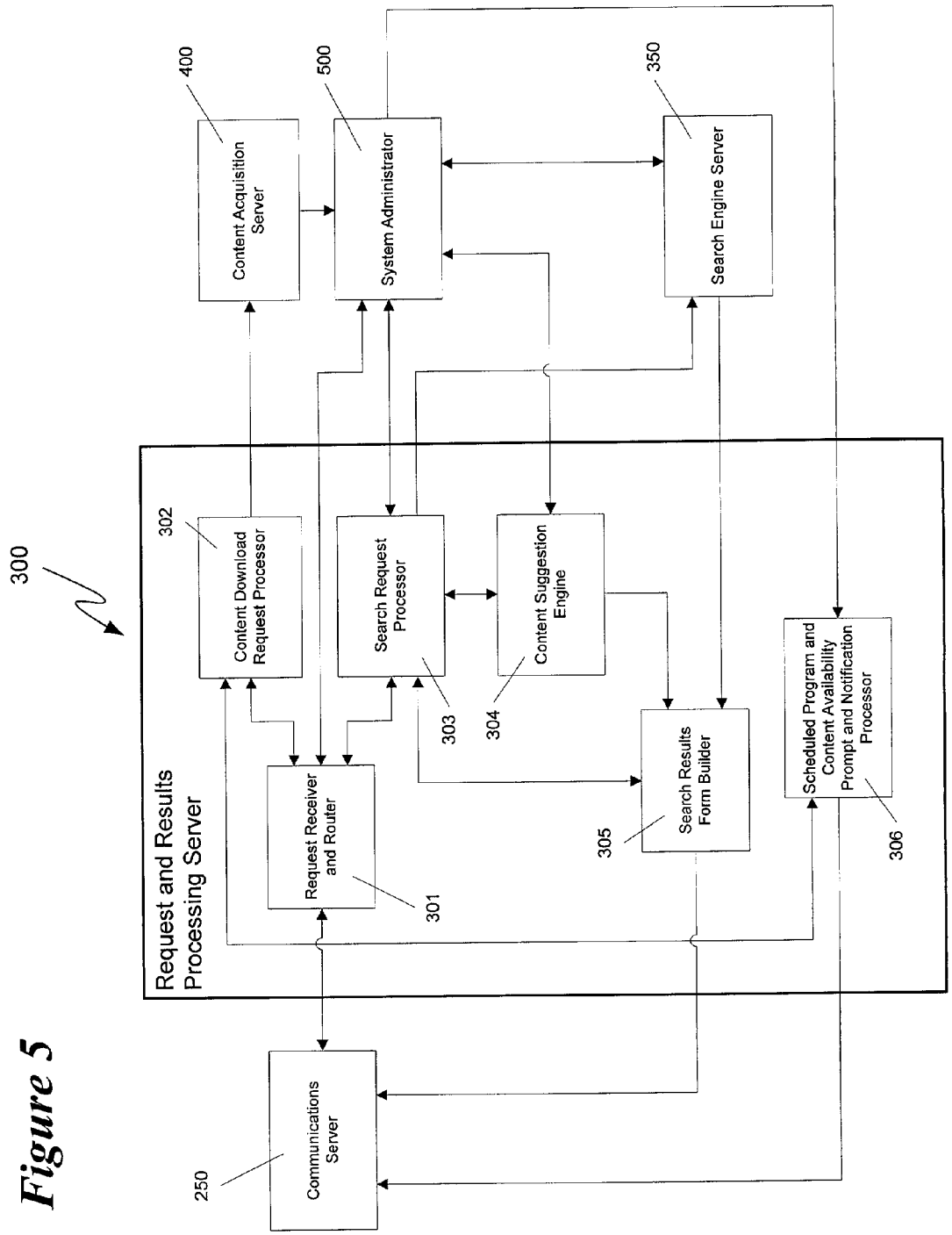
FIG. 5 is a schematic of subsystems of a request and results processing server and components with which the processing server interacts as part of the content search, packaging, and delivery system.

FIG. 5 shows individual subsystems of the request and results processing server 300. The types of requests from a system user include, but are not limited to, programming and other content search requests, content download requests based on results of an earlier search, and administrative information requests. Requests for administrative information may be automatically generated by the user terminal 202 or may be manually initiated by the system user. When an administrative request is received, a request receiver and router 301 opens a dialog with a database administrator 502 (see FIG. 7) within the system administrator 500 (see FIG. 8), retrieves the requested system user's administrative data, and routes the data through the communications server 250 to the user terminal 202. Search requests and content download requests are routed to a search request processor 303 and a content download request processor 302, respectively. The processors 302 and 303 open a dialog with the database administrator 502 and verify that the user's request is authorized. If the user's request is not authorized, the processor (302 or 303) sends a message to the user through the request receiver and router 301 and the communications server 250 informing the user that the request is denied. The processor (302 or 303) then logs the event with the system administrator 500. If the request is authorized, the processor (302 or 303) formats the request as necessary and routes content download requests to the content acquisition server 400 and search requests to the search engine server 350.

In addition to searching for content containing criteria entered by a system user, a content search suggestion engine 304, in conjunction with the search engine server 350 will be able to suggest content to the user that is related in various ways, such as by category or theme. The content search suggestion engine 304 is shown in detail in FIG. 6a. For example, if a user wishes to see programs about Titanic, the content search suggestion engine 304 may, in addition to suggesting programs about Titanic, suggest or inform the user of programs and other content such as electronic books about ships other than Titanic. Likewise, if the search criteria include Johnny Weismuller, an actor who starred in Tarzan movies, the content search suggestion engine 304 might suggest programs and other content about Tarzan featuring someone other than Johnny Weismuller. Furthermore, the content search suggestion engine 304 may suggest programs for viewing based on past search criteria entered by the user as well as information on content the user has actually downloaded. For example, if the search criteria includes Johnny Weismuller and the user has searched and/or downloaded numerous sports-related programming in the past, the content search suggestion engine 304 may suggest programming and other content including swimming competitions and sports history and biography programming as well as Tarzan movies and other content directly related to Johnny Weismuller such as the Jungle Patrol television series. If the user searched for and received Tarzan movies, the programming search suggestion engine 304 might suggest electronic books by Edgar Rice Burroughs. Such electronic books could then be downloaded to the user terminal 202 using the wide area network/Intranet 205 bypassing the aggregator 201, or could be compiled at the aggregator 201 for delivery to the user terminal 202. Electronic book delivery systems are described in U.S. Pat. No. 5,986,690, entitled "Electronic Book Selection and Delivery System," to Hendricks, and in co-pending patent application Ser. No. 09/289,957, entitled "Electronic Book Alternative Delivery Systems," and Ser. No. 09/289,956, entitled "Electronic Book Alternative Delivery Methods," both of which are hereby incorporated by reference.

During submission of a content search request, the user may have the option of disabling the return of suggested content results if desired. In order to retrieve results for suggested programming, the content search suggestion engine 304 analyzes a search request form received from the user terminal 202, and performs a search within a suggestion database 308 for additional search criteria to be used to find suggested content related in some way to the original search request results. These suggested search criteria are appended to the search request form forming an augmented search request form (not shown) when the search request form 618 is forwarded to the search engine server 350 in order for a suggested content list to be returned. U.S. Pat. No. 5,798,785 entitled "Terminal for Suggesting Programs Offered on a Television Program Delivery System," and co-pending patent application Ser. No. 08/906,469, filed Aug. 5, 1997, entitled "Reprogrammable Terminal for Suggesting Programs Offered on a Television Program Delivery System," both of which are hereby incorporated by reference, provide additional details on program suggestion.

The suggestion database processor 307 (shown in FIG. 6a and in more detail in FIG. 6c) conducts a search of the suggestion database 308 to find related search criteria to use to locate suggested content. The processor 307 also performs management functions for the other subsystems of the content search suggestion engine 304. When prompted by the suggestion database processor 307, the content metadata crawler 309 crawls, or intensively searches, the metadata in the aggregator local database 501. The suggestion database processor 307 may prompt the content metadata crawler 309 on a periodic basis, for example daily. Alternatively, the prompt may be based on the occurrence of a specific event, such as an update of the aggregator local database 501. In an embodiment, the suggestion database processor 307 does not provide a prompt, and the content metadata crawler 309 continually crawls the metadata files in the local aggregator database 501.

The content metadata crawler 309 passes a listing of all content metadata in the aggregator local database 501 to the suggestion keyword indexer 310. The suggestion keyword indexer 310 then indexes each metadata element. (A content metadata element may be a term contained in a record that defines or describes a program or content file.) The suggestion keyword indexer 310 may assign each metadata element with a vector quantity that describes the metadata element as a suggestion keyword associated with a particular content entity. In an embodiment, the vector quantity is a measure of similarity between two words. The vector quantity may be calculated by determining relative values of several categorized descriptions of each word, including word types, parts of speech of each word, and relative locations or linkages in a thesaurus and/or lexicon. The indexer 310 then populates the suggestion database 308 with these indexed suggestion keywords, which are subsequently used by the suggestion database processor 307 along with historical data relevant to the user, to supply a list of suggested search terms. The search terms are then added to the search request form 618 to create the augmented search request form that is returned to the search request processor 303 (see FIG. 5).

Figure 6A:
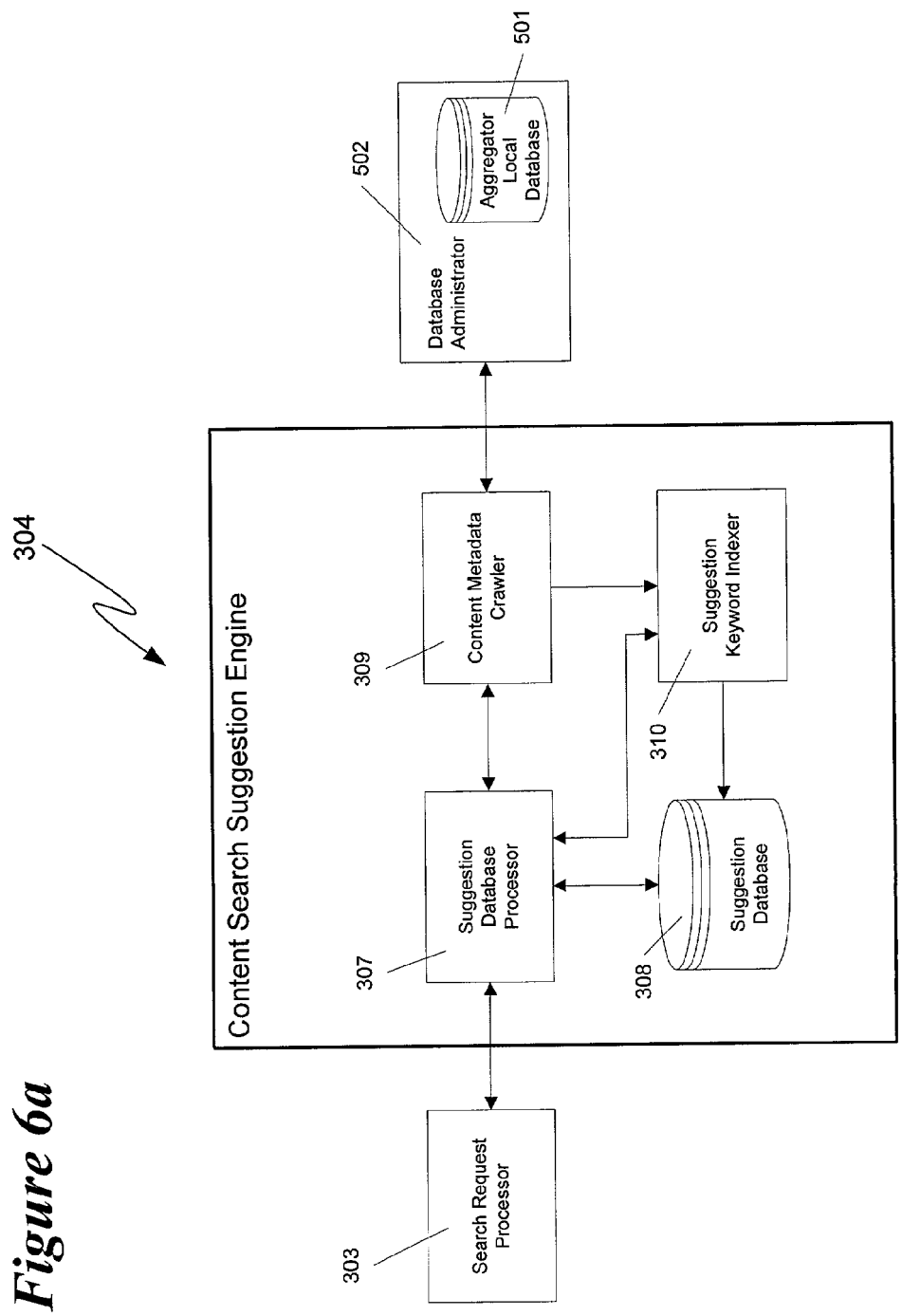
FIG. 6a is a schematic of subsystems of a content search suggestion engine and components with which the content search suggestion engine interacts as part of the content search, packaging, and delivery system.
Figure 6B:
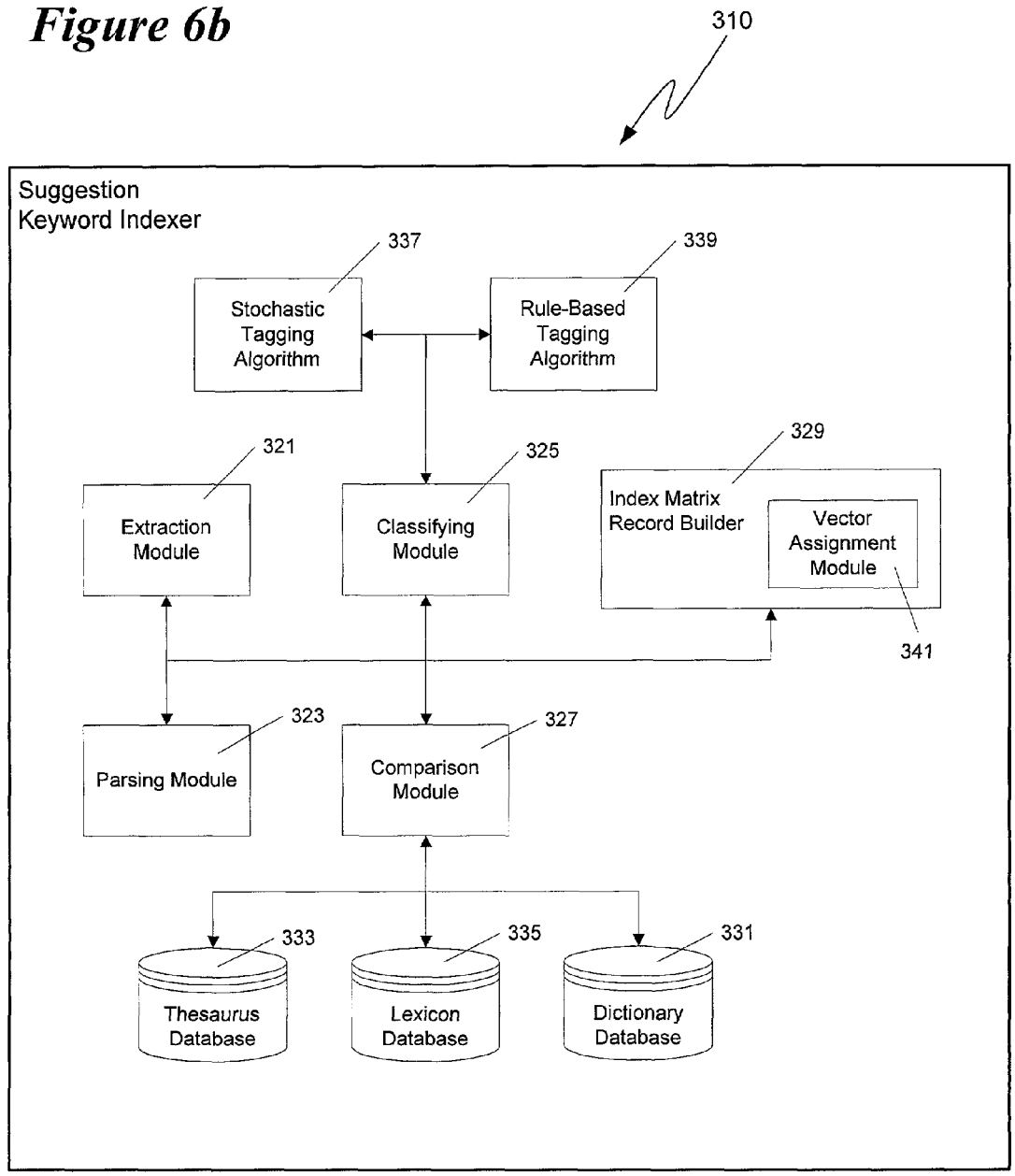

The suggestion keyword indexer 310, shown in detail in FIG. 6b, includes an extraction module 321 that extracts and caches a value of each metadata field. Metadata fields may be considered to fall within one or more categories such as uniquely identifying and non-uniquely identifying fields. Non-uniquely identifying fields may be those fields that classify the content, and may include genre, category, subject, and content format, for example. The uniquely identifying fields may include program content information, or metadata, including one or more of content type, content title, date of production, rating and parental notice information, performer, artist, writer, author, plot summary, keyword list, and textual content description. Coupled to the extraction module 321 is a parsing module 323 that parses contents of uniquely identifying metadata fields. The contents of a uniquely identifying field may include one or more word items that may be used to suggest additional content for access by the user. Coupled to the parsing module 323 is a classifying module 325 that may classify one or more of the word items. A comparison module 327 coupled to the classifying module 325 may compare word items to a set of database entries to determine a list of related terms. An index matrix record builder 329 may then create and augment an index matrix record for each of the classified word items.

Coupled to the comparison module 327 may be one or more databases, such as a dictionary database 331, a thesaurus database 333 and a lexicon database 335. The comparison module 327 compares a word item to entries in one or more of the dictionary database 331, the thesaurus database 333 and the lexicon database 335 and produces, as the list of related terms, one or more of a dictionary definition, lexicon data, and one or more synonyms.

The classifying module 325 may include computational linguistics tools, such as a rule-based part-of-speech tagging algorithm 337 and a stochastic part-of-speech tagging algorithm 339. The classifying module 325 uses the computational linguistic tools to determine part-of-speech data of a word item. The index matrix record builder 329 may then add the part-of-speech data to the index matrix record for the word item.

The index matrix record builder 329 may include a vector assignment module 341 that assigns a word item vector value for a word item. The word item vector value may be a measure of similarity between a word item and a related term.

Figure 6C:
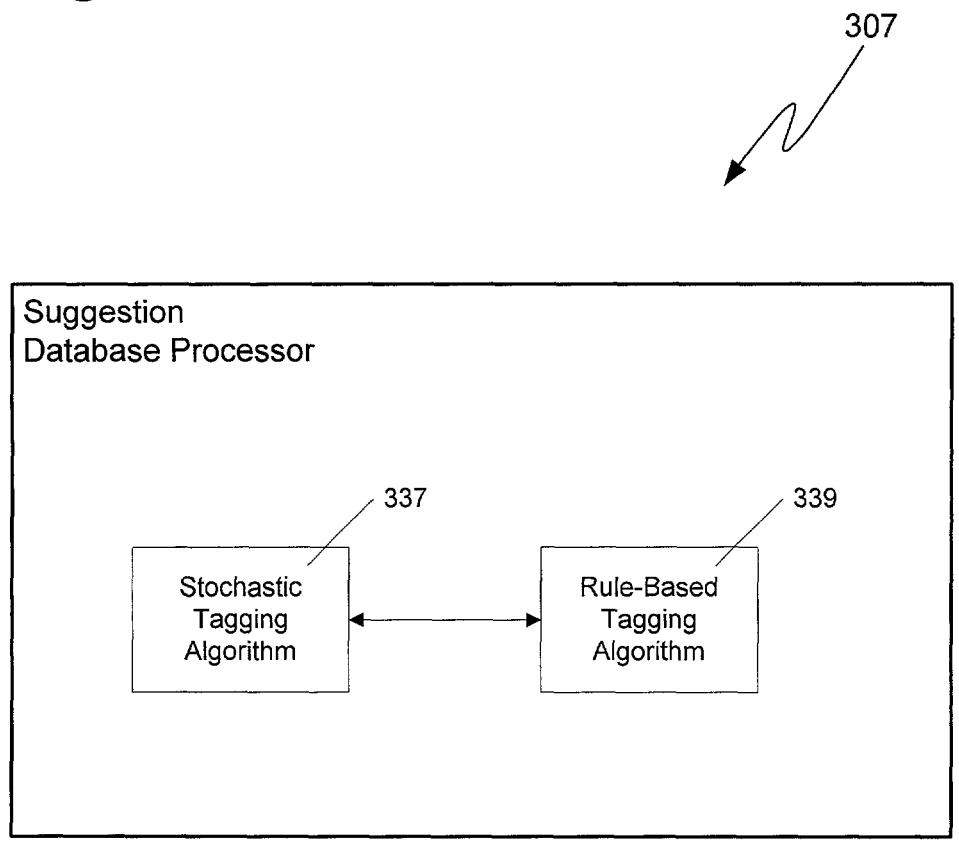

FIG. 6c shows the suggestion database processor 307 in more detail. A vector determination module 343 assigns a search term suggestion vector range to one or more of the search request criteria contained in the search request form. A vector value comparator 345 compares the search term suggestion vector range and the word item vector value to determine if a word item vector value falls within the suggestion vector range. Word items that fall within the suggestion vector range may be used to search the suggestion database.

Figure 7:
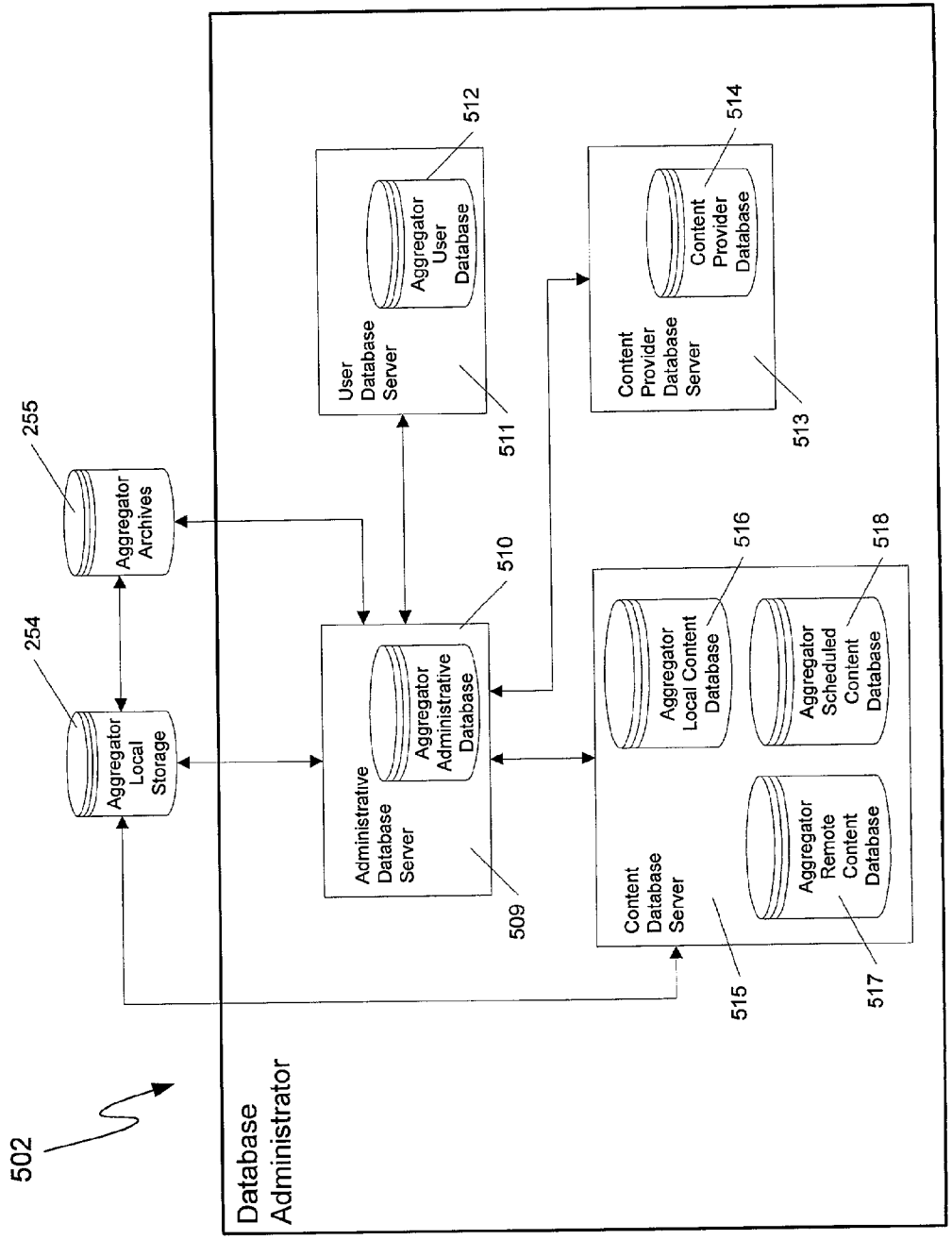
FIG. 7 is a schematic of subsystems of a database administrator as part of the content search, packaging, and delivery system.
Figure 8:
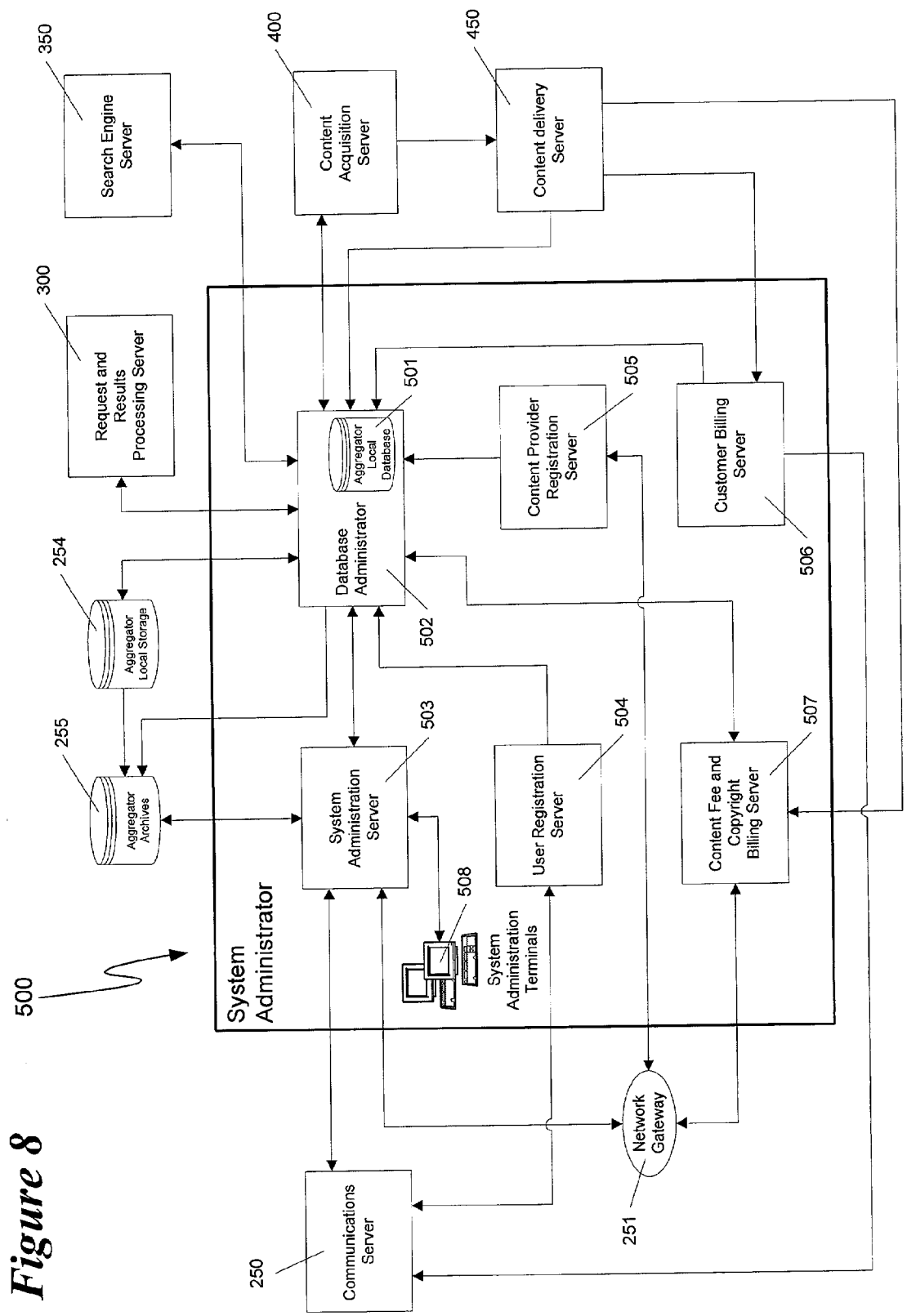
FIG. 8 is a schematic of subsystems of a system administrator and components with which the system administrator interacts as part of the content search, packaging, and delivery system.

A database administrator 502, shown in detail in FIG. 7, as part of the system administrator 500 (see FIG. 8) maintains the aggregator local database 501 and interfaces with the various components of the aggregator 201 that retrieve information from and store information to the aggregator local database 501. Word items that fall within the suggestion vector range may be appended to a search request form to create an augmented search request form that may be used by the search request processor 303 to return suggested content results. A group of individual databases maintained within the database administrator 502 constitutes the aggregator local database 501. An administrative database server 509 maintains an aggregator administrative database 510, which stores and processes information including, but not limited to, authorized system administrators, passwords, and administrator usage rights. The administrative database server 509 also governs replication of all databases to aggregator local storage 254 and backup of aggregator local storage 254 to the aggregator archives 255. A user database server 511 maintains an aggregator user database 512, which stores and processes information including, but not limited to, user account data, user profile information, user subscription services, user access rights, and past user search and download data (if authorized by the user).

A content provider database server 513 maintains a content provider database 514, which stores and processes information including, but not limited to, a roster of registered content providers and their administrative data, remote provider administrators and their passwords and access rights, and terms of agreements between providers and the operator of the particular aggregator 201. A content database server 515 maintains an aggregator local content database 516, an aggregator remote content database 517, and an aggregator scheduled content database 518. The aggregator local content database 516 stores and processes information including, but not limited to, the catalog of all content stored in the aggregator local storage 254 and all metadata associated with that content. The aggregator remote content database 517 stores and processes information including, but not limited to, the catalog of all content stored in each remote database 261 and all metadata associated with that content. The aggregator scheduled content database 518 stores and processes information including, but not limited to, scheduled broadcast programming content and scheduled streaming program content available to users, available live programming, recurring scheduled programming, and program schedule metadata information.

The system user can initiate content search requests by entering several different types of search criteria using several different options of input device or method. Search criteria can be entered using keywords that relate to certain aspects of programming content including, but not limited to, subject, author, title, cast members or performers, director, and/or content description. A search can be based on program type or format including, but not limited to, movies, television series, documentaries, sports programs, talk radio, music radio, and electronic books. The user may input search criteria based on subject categories including, but not limited to, action, drama, history, educational, juvenile, adult, current events, nature, live events, and music categories such as classical, jazz, rock, consumer affairs, political content, and geographically specific content. Search criteria can also be entered based on time of day, channel, and/or content provider. The user may also input free form questions using plain speech patterns. In any case, the different search criteria can be used separately or in conjunction with one another to refine a content search. An example might be the entry of "Titanic" as a keyword, "Documentary" for program type, and the free form question "What company built Titanic?".

Figure 9:
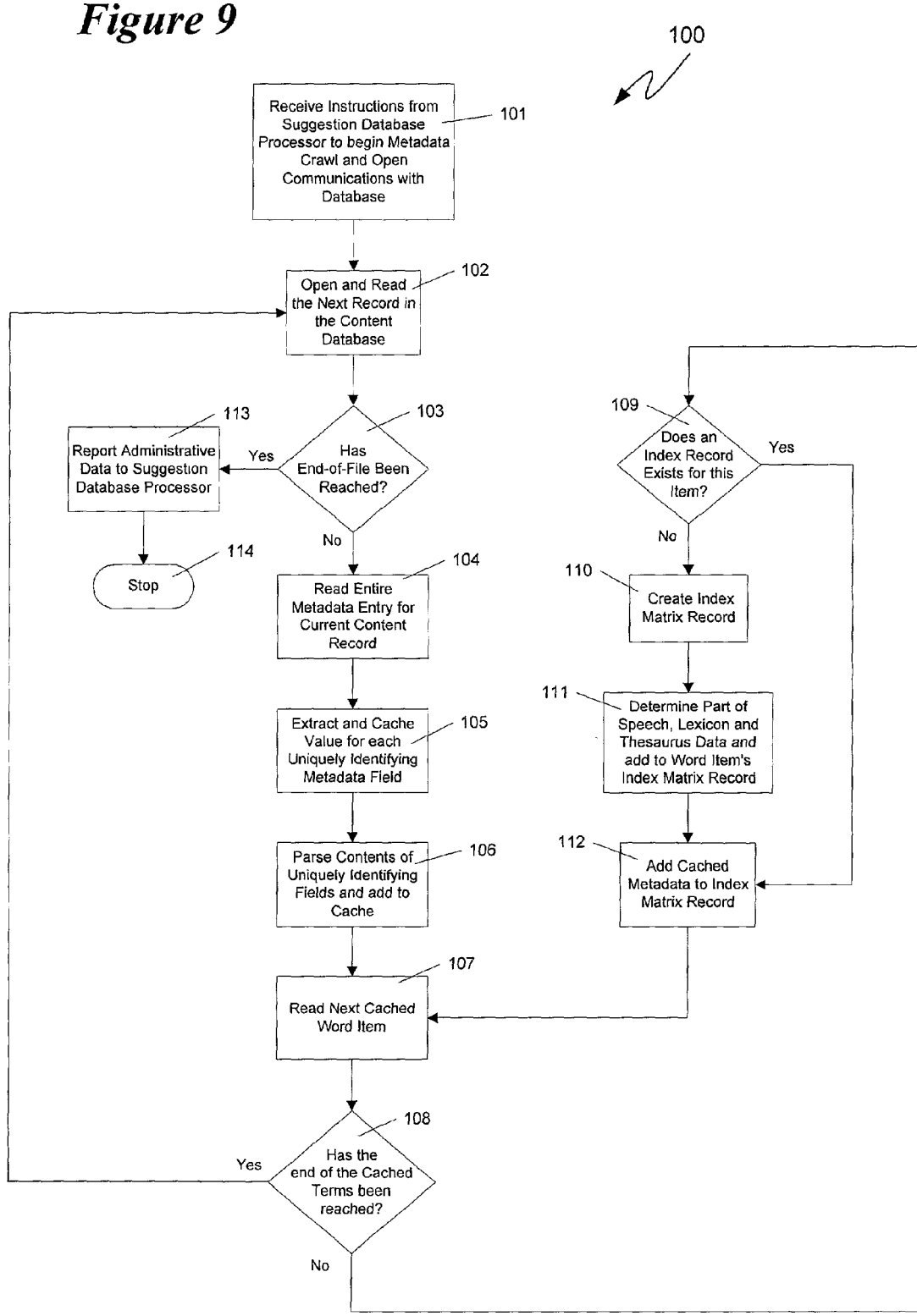
FIG. 9 shows a flowchart describing a process of building and maintaining a database of suggestion terms.

The content search suggestion engine 304 shown in FIGS. 6a-6c builds and maintains the suggestion database 308 and analyzes content search requests along with the users' histories and profiles to create lists of suggested search terms to be appended to the search request form. Content is suggested by creating a list of suggested search criteria based on the user's profile, history, and current search request and submitting this suggested search criteria in parallel with the user defined search criteria to the search engine server 350. The content metadata crawler 309 performs a crawl, or thorough search, of the content metadata contained in the aggregator local database 501 maintained by the system administrator 500. In an embodiment, the search suggestion engine 304 may contain and maintain a replica of the content portion of the aggregator local database 501 in order to perform metadata crawling internally thereby reducing the processor and communications loading on the system administrator 500. FIG. 9 is an overview of the subroutines that build and maintain the suggestion database 308. The process is initiated with routine 101, which receives instructions from the suggestion database processor 307 to begin a metadata crawling operation on the aggregator local database (see FIG. 8). Routine 101 may then open a communications session with the database administrator 502. Routine 102 then queries the next record in the database and routine 103 tests whether an end-of-file condition within the database has been reached. If the end of file condition has been met, the metadata crawling process has accessed every record in the local aggregator database and processing is passed to routine 113 which reports administrative data back to the suggestion database processor 307 and terminates the metadata crawling process, routine 114. Until the end of file condition has been met, processing is passed from routine 103 to routine 104, which reads the entire metadata entry for the current content record into local memory.

Processing is then routed to the suggestion keyword indexer 310 module, which extracts and caches the values, or entries, of each metadata field, routine 105. Routine 106 parses the contents of uniquely identifying metadata fields by breaking down the entries into component words and phrases and eliminating common terms and words such as "the," "and," "it," "which," "then," "by," "of," "he," "she," and "them." Uniquely identifying metadata fields in the metadata record may be those metadata fields that do not have a finite list of potential values. Examples of uniquely identifying fields include content title, performers, artist, writer, author, keyword list, plot summary, and textual content description. Routine 106 then caches, or saves, each word item into temporary local memory, or cache, creating a temporary list of word items. Routine 107 then reads the next cached word item and routine 108 tests whether the end of the cached list of terms has been reached, in which case the processing is routed back to routine 102 to access the next metadata record in the database. Until the end of the cached list is reached, processing is passed to routine 109, which determines if an index matrix record already exists for the current word item. If an index matrix record does not already exist, routine 110 creates a new index matrix record for the word item in the suggestion database 308 and then routes processing to routine 111. Routine 111 determines the part of speech of the word item, such as noun or verb, using computational linguistics tools that may include ruled-based and/or stochastic parts-of-speech tagging algorithms. Routine 111 may also access one or more thesaurus and/or lexicon databases and return data that may include the word item's definition and a list of related terms including synonyms. One or more thesaurus and/or lexicon databases may reside locally in the suggestion database 308 or elsewhere within the system 200 or may reside remotely on the network and may be accessed through the network gateway 251. Routine 111 then adds part-of-speech, lexicon, and thesaurus data to the word item's index matrix record. Words that cannot be tagged as known parts of speech may be designated as possibly being proper nouns or names and are verified against known proper nouns and names located in the lexicon databases and this data is added to the word item's index matrix record. The suggestion keyword indexer 310 may add unknown words to the index matrix within the suggestion database 308 and may track occurrences of unknown word items in order to establish recurring word items as desirable entries in the index matrix and to gradually downgrade and eliminate word items that in fact do not have relevance to digital content being made available by the system 200.

Processing then continues within the suggestion keyword indexer 310 with routine 112. If it was determined earlier by routine 109 that an index matrix record already existed for the current word item, then processing would have been routed directly to routine 112 bypassing routines 110 and 111, which would have already been completed for the current word item. Metadata that was cached by routines 105 and 106 for the current word item is now entered into the index matrix record for the current word item, routine 112. The index matrix comprises numerous tabular entries or records similar to the structure of a database and each entry may contain numerous fields with field descriptive information and field entry data that may assume various alphanumeric values. The values that a field entry may assume may be either unlimited or may be limited to a finite list of potential values. Algorithms may operate on index matrix entries as vector quantities either in whole or in part. In an embodiment, the suggestion database 308 comprises the metadata index matrix that contains a matrix entry for every word item parsed from all available metadata records in the aggregator local database. The metadata index matrix may be structured so that every word item has an index matrix record that contains information about that word item such as the original metadata field where the item was found and a listing of all other word items found in all other fields. Through the iterative metadata crawling and indexing process 100 shown in FIG. 9, the suggestion database 308 may be populated with virtually every word, term, and name associated with all types of digital content to be made available to system 200 users.

Figure 10:
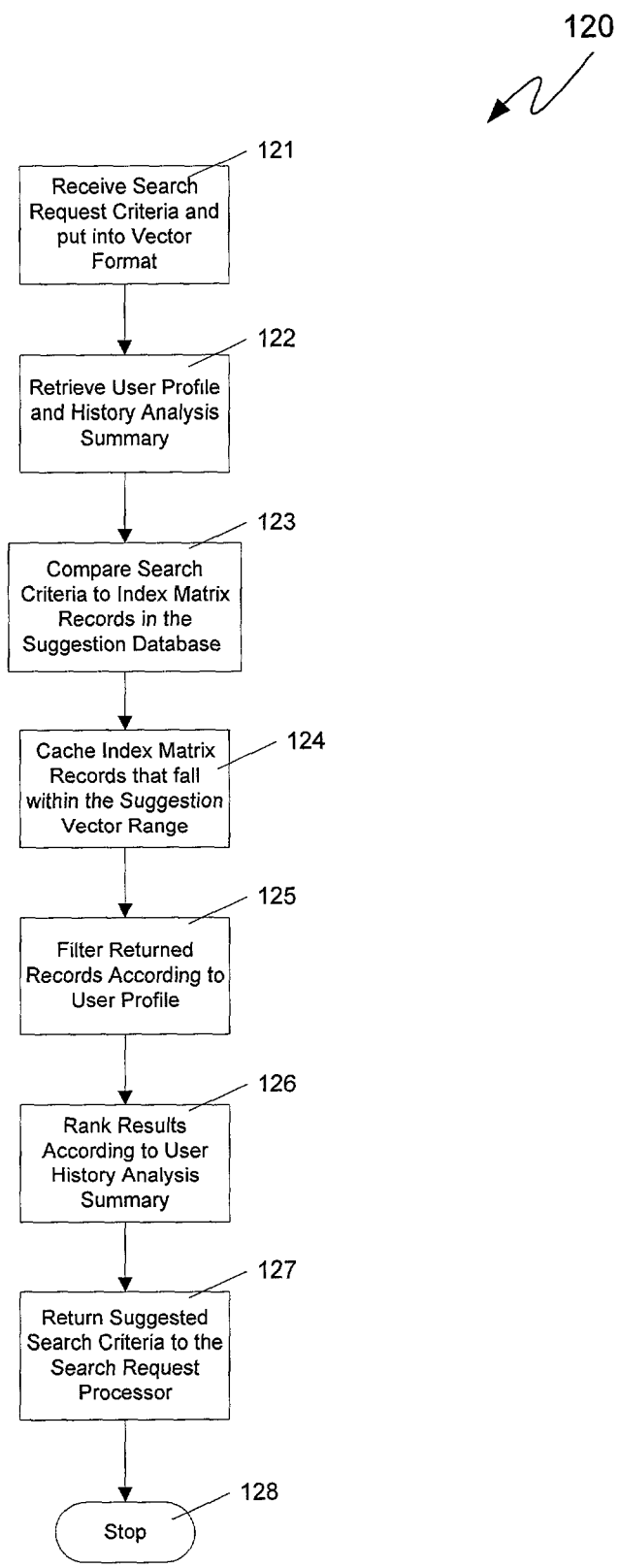
FIG. 10 shows a flowchart describing a process of using current search request criteria along with user profile and history data for retrieving suggested search parameters from the suggestion database.

FIG. 10 shows an overview of the suggested search criteria retrieval process 120 performed by the suggestion database processor 307 in which the current search request criteria along with user profile and history data may be used as comparison criteria for retrieving suggested search parameters from the suggestion database 308. The content search suggestion engine 304 first receives the search request criteria (routine 121) for the current user search request from the search request processor 303 within the request and results processing server 300 and puts the search requests criteria into a vector format like that of the index matrix records. The suggestion engine 304 then opens a communications dialog with the database administrator 502 within the system administrator 500 and requests and retrieves the user profile and user history analysis report for the user that has submitted the current search request, routine 122. The user profile comprises content search parameters and preferences that may be controlled by the user and may be augmented by the system administrator 500 based on criteria such as user account type, user access level, and historical data. The user history analysis report is a summary of statistical analysis of the user's previous account activities that may include previous search requests, returned search results, and content download requests. The history analysis report is compiled by the user database server 511 within the database administrator 502 and comprises information such as a percentage breakdown of content types and genres for which a user has requested searches, statistical breakdown of content that the user has downloaded, and summary data about content that was selected for download from earlier suggested content results.

The suggestion database processor 307 then takes the vector-formatted search request criteria and performs a comparison against the index matrix, routine 123. Each comparison may determine whether a particular index matrix record falls within a suggestion vector range of the search criteria, and if so routine 124 caches that particular matrix record into a temporary memory list. The suggestion vector range may be a measure of how similar the matrix record is to the search criteria and may have its values be adjustable so that tighter ranges may result in fewer, more-relevant suggestion criteria and wider ranges may result in a larger number of somewhat broader results. This suggestion vector range may be adjustable by the user in the form of scaling how wide or how narrow the user wishes suggested search results to be and may also be adjustable automatically by the suggestion database processor 307 based on trend analysis of the user's previous download of suggested content. The vector quantity of a search request criteria and an index matrix record is a measure of similarity between the two entries that is calculated by determining relative values of several categorical descriptions of each word including word type, part of speech of each word, relative locations or linkages in a thesaurus, and occurrence of a search term within a relevant or similar term field of an index matrix record.

Once the comparison has been completed for the entire index matrix, the cached records that fell within the suggestion vector range are then filtered by routine 125 according to the user's profile. This filtering may take into account such factors as the user's preferences and approved content access level. The filtered results are then forwarded to routine 126, which then ranks the results according to the user's historical analysis report and ranks the results by relevance and by similarities to previously searched and downloaded content. The ranking of results may take into account historical criteria so that if a user consistently searches more frequently by selecting program type, then matching program type suggestions will be weighted more and therefore ranked higher in the suggested search criteria than other attributes such as genre or content provider. The resulting list of suggested search criteria is then formatted into a data file and sent by routine 127 to the search request processor 303 for inclusion in the content search. Processing then stops at routine 128.

The content suggestion process may be carried out without intervention by or the attention of the system user so that the process may be transparent to the user with the exception that content results may contain a section designated as suggested content or individual content listings may be designated as suggested versus being a direct result of search criteria originally input by the user. This system user may be given the option to control the level of suggested content that is returned with search results and may range from no suggested results up to a broad list of suggested content results. If desired, the user may also be able select or filter user profile and historical data that may be used for the search criteria suggestion process.

The invention claimed is:

1. A method, comprising:

calculating, by at least one processor of a computing device, a plurality of values, each value of the plurality of values corresponding to a degree of similarity between a keyword of one or more keywords input by a user and a related term of plurality of related terms identified by the at least one processor;

utilizing, by the at least one processor, the plurality of values to identify a portion of the plurality of related terms, each term of the portion of the plurality of related terms being associated with a value of the plurality of values that is within an adjustable suggestion range comprising a range of values that corresponds to a degree of similarity associated with and indicated by the user;

initiating, by the at least one processor, a search of a plurality of metadata elements using search request criteria comprising the one or more keywords and the portion of the plurality of related terms; and generating, by the at least one processor and based on results of the search, a list of digital content accessible to the user, the list comprising a result portion and a suggested portion, the result portion comprising one or more items of the digital content identified based on the one or more keywords, and the suggested portion comprising one or more items of the digital content identified based on the portion of the plurality of related terms.

2. The method of claim 1, wherein each of the plurality of metadata elements describes an aspect of digital content accessible to the user.

3. The method of claim 2, wherein the digital content accessible to the user comprises at least one of video, audio, multimedia, television programming, radio programming, computer software, or an electronic book.

4. The method of claim 1, wherein the list visibly delineates the result portion from the suggested portion.

5. The method of claim 1, further comprising ranking the one or more items of the digital content identified based on the portion of the plurality of related terms.

6. The method of claim 5, further comprising performing a historical analysis associated with the user, and wherein ranking the one or more items of the digital content identified based on the portion of the plurality of related terms comprises ranking the one or more items of the digital content identified based on the portion of the plurality of related terms based on results of the historical analysis.

7. The method of claim 6, wherein the results of the historical analysis indicate one or more similarities between the one or more items of the digital content identified based on the portion of the plurality of related terms and one or more items of digital content previously accessed by the user.

8. The method of claim 1, further comprising filtering the list using a filter defined by the user.

9. The method of claim 1, wherein the list comprises a reference to digital content that will be available at a future date.

10. The method of claim 1, wherein the list comprises a reference to digital content stored at a remote location.

11. The method of claim 1, further comprising extracting a plurality of words from the plurality of metadata elements.

12. The method of claim 11, wherein identifying the plurality of related terms comprises identifying at least a portion of the plurality of related terms from amongst the plurality of words.

13. The method of claim 1, further comprising adjusting the adjustable suggestion range based a number of times the user has previously accessed one or more items of suggested digital content.

14. The method of claim 1, wherein identifying the plurality of related terms comprises searching at least one of a dictionary database, a thesaurus database, or a lexicon database for an entry corresponding to one of the one or more keywords, and wherein the entry corresponding to the one of the one or more keywords comprises at least one of the plurality of related terms.

15. The method of claim 1, wherein identifying the plurality of related terms comprises utilizing at least one of a rule-based part-of-speech tagging algorithm or a stochastic part-of-speech tagging algorithm to classify one of the one or more keywords, and wherein at least one of the plurality of related terms is identified based on a classification of the one of the one or more keywords.

16. The method of claim 1, further comprising receiving the one or more keywords from at least one of a set-top box, an electronic book reader, or a personal computer.

17. A method, comprising:
  extracting, by a computing device comprising at least one processor, a plurality of words from a plurality of metadata elements that describe one or more aspects of digital content accessible to a user device;
  receiving, by the computing device and from the user device, user search criteria comprising one or more keywords;
  identifying, by the at least one processor, a plurality of related terms, wherein each term of the plurality of related terms is related to at least one of the one or more keywords;
  calculating, by the at least one processor, a plurality of values, each value of the plurality of values corresponding to a degree of similarity between a keyword of the one or more keywords and a related term of the plurality of related terms;
  identifying, by the at least one processor, based on the plurality of values and an adjustable suggestion range comprising a range of values that corresponds to a degree of similarity associated with and indicated by a user of the user device, a portion of the plurality of related terms that are within the degree of similarity;
  searching, by the at least one processor, the plurality of words for one or more occurrences of at least one of the one or more keywords or one or more terms of the portion of the plurality of related terms; and
  generating, by the at least one processor, a list of a portion of the digital content accessible to the user device, wherein the list comprises a search result portion comprising one or more items of the digital content identified based on the one or more keywords and a suggestion portion comprising one or more items of the digital content identified based on the one or more terms of the portion of the plurality of related terms.

18. A method, comprising:
  receiving, by a computing device comprising at least one processor and from a user device, search request criteria for identifying one or more items of digital content accessible to the user device, the search request criteria comprising one or more keywords;
  identifying, by the at least one processor and based on the one or more keywords, a plurality of related terms;
  calculating, by the at least one processor, a plurality of values, each value of the plurality of values corresponding to a degree of similarity between a keyword of the one or more keywords and a related term of the plurality of related terms;
  determining, by the at least one processor and based on a number of times a user of the user device has previously accessed one or more items of suggested digital content, a range of values indicating a degree of similarity associated with the user;
  utilizing, by the at least one processor, the plurality of values to identify a portion of the plurality of related terms, each term of the portion of the plurality of related terms being associated with a value of the plurality of values that is within the range;
  utilizing, by the at least one processor, the one or more keywords and at least one term of the portion of the plurality of related terms to identify a plurality of items of the digital content; and
  generating, by the at least one processor, a list of the plurality of items of the digital content, wherein the list comprises a search result portion comprising one or more items of the digital content identified based on the one or more keywords and a suggestion portion comprising one or more items of the digital content identified based on the at least one term.

19. The method of claim 17, wherein the list visibly delineates the search result portion from the suggestion portion.

20. The method of claim 17, further comprising ranking the one or more items of the digital content identified based on the one or more terms of the portion of the plurality of related terms.

21. The method of claim 20, further comprising identifying one or more similarities between the one or more items of the digital content identified based on the one or more terms of the portion of the plurality of related terms and one or more items of digital content previously accessed by the user, and wherein the ranking is based on the one or more similarities.

22. The method of claim 17, further comprising adjusting the adjustable suggestion range based a number of times the user has previously accessed one or more items of suggested digital content.

23. The method of claim 18, wherein the list visibly delineates the search result portion from the suggestion portion.

24. The method of claim 18, further comprising:
   identifying one or more similarities between digital content in the suggestion portion and digital content previously accessed by the user; and
   ranking the digital content in the suggestion portion based on the one or more similarities.

25. The method of claim 18, further comprising filtering the list using a filter defined by the user.

26. The method of claim 18, wherein the list comprises a reference to digital content that will be available at a future date.

* * * * *